United States Patent [19]
Matsumoto et al.

[11] Patent Number: 5,355,354
[45] Date of Patent: Oct. 11, 1994

[54] NON-OVERWRITABLE MAGNETOOPTICAL RECORDING APPARATUS USING EXCHANGE-COUPLED TWO-LAYERED MEDIUM WITH INTERFACE MAGNETIC WALL

[75] Inventors: Hiroyuki Matsumoto; Jun Saito, both of Tokyo, Japan

[73] Assignee: Nikon Corporation, Tokyo, Japan

[21] Appl. No.: 48,178

[22] Filed: Apr. 20, 1993

Related U.S. Application Data

[62] Division of Ser. No. 712,743, Jun. 10, 1991, Pat. No. 5,235,569.

[30] Foreign Application Priority Data

Jun. 13, 1990 [JP] Japan .................................. 2-154288
Jun. 29, 1990 [JP] Japan .................................. 2-172237

[51] Int. Cl.$^5$ ............................................. G11B 13/04
[52] U.S. Cl. ........................................ 369/13; 360/114
[58] Field of Search ................. 369/13, 14; 360/59, 360/114

[56] References Cited

U.S. PATENT DOCUMENTS

| | | | |
|---|---|---|---|
| 5,014,252 | 5/1991 | Akasaka et al. | 369/13 |
| 5,016,232 | 5/1991 | Tadokoro et al. | 369/13 |
| 5,088,074 | 2/1992 | Sato | 369/13 |
| 5,126,986 | 6/1992 | Saito et al. | 369/13 |
| 5,128,910 | 7/1992 | Iida | 369/13 |
| 5,144,601 | 9/1992 | Maeda | 369/13 |
| 5,210,724 | 5/1993 | Kobayashi | 360/114 |

Primary Examiner—Hoa T. Nguyen
Attorney, Agent, or Firm—Shapiro and Shapiro

[57] ABSTRACT

A non-overwritable recording apparatus comprises a magnetooptical recording media including at least first and second exchange-coupled layers having perpendicular magnetic anisotrophy, the Curie temperature of the second layer being higher than that of the first layer. The direction of magnetization of the second layer is aligned in a predetermined direction, without changing the direction of magnetization of the first layer, and the direction of magnetization of the first layer is aligned in a direction such that an interface magnetic wall is formed between the first and second layers in at least each recording portion of the medium. While the medium is rotated, a laser beam is radiated on the medium and is pulse-modulated, according to information to be recorded, between a first intensity level which imparts to a recording portion a temperature at least as high as the Curie temperature of the first layer and lower than that of the second layer and which thereby forms a mark having no interface magnetic wall between said first and second layers, and a second intensity level, including zero-level, which imparts to a recording portion a temperature lower than a lowest temperature at which the interface magnetic wall disappears, whereby the mark is not formed. In a modification, the first intensity level imparts to a recording portion a temperature lower than the Curie temperature of the first layer and at least as high as a lowest temperature at which an interface magnetic wall between the first and second layers disappears.

12 Claims, 20 Drawing Sheets

NON-OVERWRITABLE MAGNETOOPTICAL RECORDING APPARATUS USING EXCHANGE-COUPLED TWO-LAYERED MEDIUM WITH INTERFACE MAGNETIC WALL

This is a division of application Ser. No. 712,743 filed Jun. 10, 1991 now U.S. Pat. No. 5,235,569.

BACKGROUND OF THE INVENTION

1. Field of the Invention

This invention relates to a magnetooptical recording method having high recording sensitivity and especially relates to a conventional or non-overwritable method.

2. Related Background Art

In recent years, many efforts have been made to develop an optical recording/reproduction method which can satisfy various requirements including high density, large capacity, high access speed, and high recording-/reproduction speed, and a recording apparatus, a reproduction apparatus, and a recording medium used therefor.

Of various optical recording/reproduction methods, a magnetooptical recording/reproduction method is most attractive due to its unique advantages. That is, it is repetitively possible to erase recorded information, and to record new information after previous information is erased.

A recording medium used in the magnetooptical recording/reproduction method employs a magnetic thin film having a perpendicular magnetic anisotropy as a recording layer. A typical magnetic thin film comprises an amorphous heavy rare earth-transition metal alloy. Typical alloys are GdFe or GdCo, GdFeCo, TbFe, TbCo, TbFeCo, and the like.

The recording layer normally has tracks formed by concentrical or spiral grooves or ridges, and information is recorded on the tracks.

Information to be recorded is binarized in advance, and is expressed by two small magnetic domains, i.e., a small magnetic domain (called a pit, bit, or mark) having an upward direction of magnetization, and a small magnetic domain having a downward direction of magnetization. In this specification, following the latest example, the former domain will be referred to as a mark $B_1$ hereinafter, and the latter domain will be referred to as a mark $B_0$ hereinafter. These marks $B_1$ and $B_0$ respectively correspond to one and the other of digital signal levels "0" and "1".

In general, the direction of magnetization of the recording layer is aligned in an upward or downward direction upon application of a strong external field after the manufacture of a medium, i.e., before recording. This process will be referred to as an initializing process hereinafter, and is performed by initializing means.

The reasons why the initialize process is to be executed are that ① the direction of magnetization of a magnetic thin film is not uniform in a film formation state, and that ② since it is difficult to change (modulate) the direction of a bias field Hb necessary for forming a bit at high Speed in actual recording, only one mark (mark $B_1$) is to be formed according to information.

Before recording, the direction of magnetization of the entire magnetic layer is aligned in one of upward and downward directions (corresponding to the direction of the mark $B_0$), and thereafter, the mark $B_1$ having an opposite direction of magnetization is intermittently formed according to binary information.

Information is expressed by the presence/absence of the mark $B_1$ and/or a mark length. This is the actual recording method.

The mark is formed by using a laser beam which is focused to have a spot size as small as about 1 micron, and a bias field Hb. More specifically, upon radiation of a laser beam, the irradiated portion of the magnetic thin film is heated to a temperature equal to or higher than a Curie temperature, thereby making a coercivity of the irradiated portion zero. In this state, when the radiation of the laser beam is stopped, or the irradiated portion is separated from the beam, the temperature of the irradiated portion is naturally decreased. When the temperature of the irradiated portion is decreased below the Curie temperature, the coercivity appears again in the irradiated portion. At this time, if a bias field Hb is present, the direction of magnetization follows the direction of Hb. In this manner, the mark $B_1$ having the same direction of magnetization as the direction of Hb is formed.

The formed mark $B_1$ is detected by utilizing a magnetooptical effect (Kerr effect or Faraday effect), thereby reproducing recorded information.

A C/N ratio has a positive correlation with ① $\theta$ k and ② the intensity of a laser beam to be radiated in a reproduction mode. Thus, in order to increase the C/N ratio, a magnetic material having large ① $\theta$ k must be selected. In this case, a magnetic material having large $\theta$ k has a high Curie temperature without exceptions. In order to increase the C/N ratio, if ② the intensity of a laser beam to be radiated in a reproduction mode is increased, the temperature of the recording layer undesirably exceeds the Curie temperature, and as a result, information is lost. For this reason, a magnetic material whose Curie temperature is as high as possible must be selected.

However, in the conventional recording method, as described above, the recording layer must be heated up to a temperature equal to or higher than the Curie temperature to make the coercivity zero. Therefore, when a magnetic material having a high Curie temperature is selected, recording sensitivity is undesirably lowered. That is, a high-intensity laser beam source is required, or a recording linear velocity must be lowered.

In other words, in the conventional recording method, when recording sensitivity is to be increased, a magnetic material having a low Curie temperature must be selected, and hence, the C/N ratio is lowered, thus posing a first problem.

On the other hand, a conventional magnetooptical recording method and recording apparatus require a bias field Hb applying means (more specifically, a permanent magnet or an electromagnet) as well as the laser beam source.

Since a magnetic field is abruptly lowered at positions separated from a magnet, the above-mentioned two means always occupy close positions in the recording apparatus. For this reason, the degree of freedom of design for an arrangement of members in the recording apparatus is lowered, thus posing a second problem.

The second problem often leads to a secondary problem. That is, it is difficult to attain a compact recording apparatus.

SUMMARY OF THE INVENTION

The present inventors have made extensive studies, and paid attention to a special two-layered film magnetooptical recording media. This medium is a magnetooptical recording medium in which at least two layers including a first layer comprising a magnetic thin film having a perpendicular magnetic anisotropy, and a second layer comprising a magnetic thin film having a magnetic anisotropy, and having a Curie temperature higher than or almost equal to that of the first layer are stacked to be exchange-coupled to each other, and the direction of magnetization of only the second layer can be aligned in a predetermined direction by a first external field at a room temperature without changing the direction of magnetization of the first layer.

This medium is known as an over-write capable multilayered magnetooptical recording medium and is disclosed in Japanese Laid-Open Patent Application No. 62-175948 (corresponding application: DE3619618), and Japanese Laid-Open Patent Application No. 1-277349 (corresponding application: GB2234843A).

Of various exchange-coupled multilayered film media, this medium can align the direction of magnetization of the second layer in a predetermined direction by a first external field $H_{e1}$ or another means at a room temperature without changing the direction of magnetization of the first layer.

The "predetermined direction" is a direction perpendicular to the film surface of the magnetic thin film, and means one of upward and downward directions in this specification. An opposite direction means the other of the upward and downward directions. As two-layered film media, a parallel type (P type) medium which is stable when the direction of magnetization of the first layer is the same as that of the second layer (no interface magnetic wall is formed between the first and second layers), and an antiparallel type (A type) medium which is stable when the direction of magnetization of the first layer is opposite to that of the second layer are available.

This invention uses the above-mentioned medium.

The first aspect of this invention has as its object to solve the above-mentioned first problem, and to increase recording sensitivity without lowering the C/N ratio.

According to the first aspect of this invention, there is provided a magnetooptical recording method comprising:

step 1: of preparing a magnetooptical recording medium in which at least two layers including a first layer comprising a magnetic thin film having a perpendicular magnetic anisotropy, and a second layer comprising a magnetic thin film having a perpendicular magnetic anisotropy, and a having Curie temperature higher than or almost equal to that of the first layer are stacked to be exchange-coupled to each other, and a direction of magnetization of the second layer can be aligned in a predetermined direction by a first external field at a room temperature while a direction of magnetization of the first layer is left unchanged, and which has already been set in a state wherein the direction of magnetization of the second layer is aligned in the predetermined direction, and an interface magnetic wall is formed between the first and second layers in at least a portion to be subjected to recording; and step 2: of radiating, onto the portion to be subjected to recording, a laser beam which is pulse-modulated according to information to be recorded between a first intensity level for giving, to the medium, a temperature lower than a Curie temperature $T_{CI}$ of the first layer, and higher than or equal to a lowest temperature $T_{LS}$ for causing the interface magnetic wall between the first and second layers to disappear, and a second intensity level (including zero level) for giving a temperature lower than the temperature $T_{LS}$ to the medium, wherein when the beam at the first intensity level is radiated, a mark $B_1$ having no interface magnetic wall between the first and second layers is consequently formed, and when the beam at the second intensity level is radiated, no mark $B_1$ is formed.

A modification of the first aspect of this invention is attained by adding, after steps 1 and 2 in the first aspect, step 3: of applying a second external field having a direction opposite to that of the first external field to at least the recorded portion so as to cause the interface magnetic wall present between the first and second layers in a region (corresponding to a mark $B_0$) between a given mark and a neighboring mark $B_1$ to disappear.

As is well known, the medium used in this invention is classified into P and A type media. The principle of the first aspect of this invention will be briefly described below using a P type medium.

The P type medium is stable when the directions of magnetization of the first and second layers are the same, and no magnetic wall is formed between the two layers. FIG. 1A shows this state as Condition 1. In this case, the direction of magnetization corresponds to a downward direction.

In this state, the direction of magnetization of the second layer is aligned in the upward direction upon application of the first external field $H_{e1}$ in the upward direction without changing the direction of magnetization of the first layer. More specifically, assume that the directions of magnetization of the two layers are aligned so that an interface magnetic wall is formed between the two layers. FIG. 1A shows this state as Condition 2. In FIG. 1A showing Condition 2, and subsequent drawings, a bold line between the two layers represents an interface magnetic wall. Condition 2 may be present in the entire medium, or may be present in only a portion to be subjected to recording. The upward and downward directions are respectively assumed to be positive and negative directions, and the following abbreviations are used:

$H_{C1}$ = coercivity of first layer
$H_{C2}$ = coercivity of second layer
$M_{S1}$ = saturated magnetic moment of first layer
$M_{S2}$ = saturated magnetic moment of second layer
$t_1$ = film thickness of first layer
$t_2$ = film thickness of second layer
$\sigma_w$ = exchange coupling force (interface wall energy)

The first and second layers influence each other by their coercivities and an exchange coupling force. The direction of magnetization of a layer having a small coercivity follows the direction of magnetization of a layer having a large coercivity. One layer influences the other layer via the exchange coupling force to align the direction of magnetization of the other layer in a stable direction with respect to the direction of its own magnetization. This influence is given by:

$$\frac{\sigma_w}{2 \times M_S \text{ (saturated magnetic moment)} \times \text{film thickness } t} \quad \text{Formula 1}$$

In the two-layered film medium, conditions under which Condition 2 can be present in a (quasi) stable state at a room temperature $T_R$ are given by the following Formulas 2 to 4.

P type:

$$H_{C1} > H_{C2} + \frac{\sigma_w}{2M_{S1}t_1} + \frac{\sigma_w}{2M_{S2}t_2} \quad \text{(Formula 2)}$$

A type:

$$H_{C1} > H_{C2} + \left| \frac{\sigma_w}{2M_{S1}t_1} - \frac{\sigma_w}{2M_{S2}t_2} \right| \quad \text{(Formula 2)}$$

$$H_{C1} > \frac{\sigma_w}{2M_{S1}t_1} \quad \text{Formula 3}$$

$$H_{C2} > \frac{\sigma_w}{2M_{S2}t_2} \quad \text{Formula 4}$$

On the other hand, a formula for preventing the direction of magnetization of the first layer from being reversed by the first external field $H_{e1}$ is Formula 5-1:

P type:

$$H_{C1} - \frac{\sigma_w}{2M_{S1}t_1} > H_{e1} \quad \text{Formula 5-1}$$

A type:

$$H_{C1} + \frac{\sigma_w}{2M_{S1}t_1} > H_{e1} \quad \text{Formula 5-1}$$

A formula for reversing the direction of magnetization of the second layer by the first external field $H_{e1}$ is Formula 5-2:

$$H_{e1} > H_{C2} + \frac{\sigma_w}{2M_{S2}t_2} \quad \text{Formula 5-2}$$

When Formulas 5-1 and 5-2 are combined, we have: Formula 5:

P type:

$$H_{C1} - \frac{\sigma_w}{2M_{S1}t_1} > |H_{e1}| > H_{C2} + \frac{\sigma_w}{2M_{S2}t_2}$$

A type:

$$H_{C1} + \frac{\sigma_w}{2M_{S1}t_1} > |H_{e1}| > H_{C2} + \frac{\sigma_w}{2M_{S2}t_2}$$

Condition 2 is relatively stably (quasi-stably) present at the room temperature as long as Formulas 2 to 4 are satisfied. Condition 2 is relatively stable since it is unstable as compared to a case (Condition 1) without an interface magnetic wall.

When a laser beam at first level shown in FIG. 3 is radiated to locally heat the medium, the following formulas are simultaneously satisfied considerably before the temperature of the irradiated portion reaches the Curie temperature $T_{C1}$ of the first layer. The lowest temperature at which the following formulas are satisfied will be referred to as a temperature $T_{LS}$ hereinafter.

$$H_{C1} < \frac{\sigma_w}{2M_{S1}t_1} \quad \text{Formula 6}$$

$$H_{C2} > \frac{\sigma_w}{2M_{S2}t_2} \quad \text{Formula 7}$$

As can be understood from Formulas 6 and 7, the direction of magnetization of the first layer is reversed to follow a stable direction with respect to the second layer (a parallel direction due to P type). As a result, the interface magnetic wall disappears. This state corresponds to Condition 3 in FIG. 1A.

As can be understood from Condition 3, in a portion irradiated with the beam, the direction of magnetization of the first layer is aligned in an upward direction ⇧, and an "upward ⇧ mark $B_1$" is formed. This mark has no interface magnetic wall.

In contrast to this, in a portion on which no beam is radiated, the direction of magnetization of the first layer is left in a downward direction ⇩ (corresponding to a mark $B_0$). A magnetic walls remains in this portion.

Therefore, when a laser beam is intermittently radiated on a track in accordance with binary information, marks $B_1$ according to the information are formed on the first layer of the track, thus completing recording.

When a fourth external field $H_{e4}$ is applied to simultaneously satisfy the following formulas at about the temperature $T_{LS}$, it is preferable that the direction of magnetization of the first layer is reversed at a temperature lower than the temperature $T_{LS}$ to follow a stable direction with respect to the second layer, and the interface magnetic wall disappears:

$$H_{C1} < \frac{\sigma_w}{2M_{S1}t_1} + H_{e4}$$

$$H_{C2} > \frac{\sigma_w}{2M_{S2}t_2} - H_{e4}$$

The above description has been made using the P type medium. The same applies to the A type medium.

The recording principle of the first aspect of this invention has been described. According to this method, recording (formation of marks $B_1$) is executed at the temperature $T_{LS}$ considerably lower than the Curie temperature $T_{C1}$ of the first layer. For this reason, even if a magnetic material having a high Curie temperature is used, recording sensitivity can be increased.

Information can be reproduced by using light reflected by the first layer and by utilizing the Kerr effect.

As can be understood from Condition 3, interface magnetic walls remain in portions on which no beam is radiated, and the state of the medium is relatively unstable (quasi-stable). Therefore, preservation stability is not satisfactory. When the laser beam intensity is increased to increase the C/N ratio in the reproduction mode, the medium temperature undesirably approaches $T_{LS}$. If the medium temperature reaches $T_{LS}$, as described above, a mark ⇩ with an interface magnetic wall is changed to a mark ⇧ without an interface magnetic wall, and recorded information is undesirably erased.

In order to prevent this, the direction of magnetization of the second layer of only a mark ⇩ with a magnetic wall is reversed upon application of a weak second external field $H_{e2}$ having a direction opposite to that of the first external field $H_{e1}$, as shown in FIG. 1B.

As a result, the state of recorded portions is as shown in Condition 4 in FIG. 1A.

The second external field $H_{e2}$ is a weak field satisfying Formula 8 since it must not reverse the direction of magnetization of the second layer of the marks ⇑ without interface magnetic walls:

$$-H_{C2} + \frac{\sigma_w}{2M_{S2}t_2} > H_{e2} > -H_{C2} - \frac{\sigma_w}{2M_{S2}t_2} \qquad \text{Formula 8}$$

Since $H_{C1} > H_{C2}$ is originally satisfied, if Formula 8 is satisfied, $H_{C1} > |H_{e2}|$ is satisfied. Therefore, $H_{e2}$ will not reverse the direction of magnetization of the first layer.

As can be understood from Condition 4, information remains in both the first and second layers, and no interface magnetic wall is present between the two layers. For this reason, both the marks $B_0$ and $B_1$ are stable.

For this reason, no problem is posed even when the temperature of the magnetic thin film exceeds $T_{LS}$ upon application of a laser beam in the reproduction mode. In this case, the temperature of the film must be prevented from being increased beyond the Curie temperature $T_{C2}$ of the second layer. If the film is heated up to a temperature equal to or higher than the Curie temperature $T_{C2}$, information is lost. Since the Curie temperature $T_{C2}$ of the second layer is higher than that of the first layer, if a method of radiating a laser beam onto the second layer, and reproducing information based on light reflected by the second layer is employed, the beam intensity can be increased, thus increasing the C/N ratio.

In the modification of the first aspect, step 3 of applying $H_{e2}$ is added to the first aspect. Step 3 may be executed immediately before reproduction.

The second aspect of this invention will be described below.

The second aspect has as its object to solve the second problem of the prior art by omitting a bias field applying means near a beam, and to realize a compact apparatus.

According to the second aspect of this invention, there is provided a magnetooptical recording method comprising:

step 1: of preparing a magnetooptical recording medium in which at least two layers including a first layer comprising a magnetic thin film having a perpendicular magnetic anisotropy, and a second layer comprising a magnetic thin film having a perpendicular magnetic anisotropy, and having a Curie temperature higher than that of the first layer are stacked to be exchange-coupled to each other, and a direction of magnetization of the second layer can be aligned in a predetermined direction by a first external field at a room temperature while a direction of magnetization of the first layer is left unchanged, and which has already been set in a state wherein the direction of magnetization of the second layer is aligned in the predetermined direction, and an interface magnetic wall is formed between the first and second layers in at least a portion to be subjected to recording; and step 2: of radiating, onto the portion to be subjected to recording, a laser beam which is pulse-modulated according to information to be recorded between ① a first intensity level for giving, to the medium, a temperature equal to or higher than a Curie temperature $T_{C1}$ of the first layer, and lower than a Curie temperature $T_{C2}$ of the second layer (when a beam at the first intensity level is radiated, a mark $B_1$ having no interface magnetic wall between the first and second layers is consequently formed), and ② a second intensity level (including zero level) for giving, to the medium, a temperature lower than a lowest temperature $T_{LS}$ for causing an interface magnetic wall between the first and second layers to disappear (when the beam at the second intensity level is radiated, no mark $B_1$ is formed).

A modification of the second aspect of this invention is attained by adding, after steps 1 and 2 in the second aspect, step 3: of applying a second external field having a direction opposite to that of the first external field to at least the recorded portion so as to cause the interface magnetic wall present between the first and second layers in a region (corresponding to a mark $B_0$) between a given mark $B_1$ and a neighboring mark $B_1$ to disappear.

As is well known, the medium used in this invention is classified into P and A type media. The principle of the second aspect of this invention will be briefly described below using a P type medium.

The P type medium is stable when the directions of magnetization of the first and second layers are the same, and no interface magnetic wall is formed between the two layers. FIG. 2A shows this state as Condition 1. In this case, the direction of magnetization corresponds to a downward direction.

In this state, the direction of magnetization of the second layer is aligned in the upward direction upon application of the first external field $H_{e1}$ in the upward direction without changing the direction of magnetization of the first layer. More specifically, assume that the directions of magnetization of the two layers are aligned so that an interface magnetic wall is formed between the two layers. FIG. 2A shows this state as Condition 2.

Condition 2 may be present in the entire medium, or may be present in only a portion to be subjected to recording.

The upward and downward directions are respectively assumed to be positive and negative directions, and the following abbreviations are used:

$H_{C1}$ = coercivity of first layer
$H_{C2}$ = coercivity of second layer
$M_{S1}$ = saturated magnetic moment of first layer
$M_{S2}$ = saturated magnetic moment of second layer
$t_1$ = film thickness of first layer
$t_2$ = film thickness of second layer
$\sigma_w$ = exchange coupling force (interface wall energy)

The first and second layers influence each other by their coercivities and an exchange coupling force. The direction of magnetization of a layer having a small coercivity follows the direction of magnetization of a layer having a large coercivity. One layer influences the other layer via the exchange coupling force to align the direction of magnetization of the other layer in a stable direction with respect to the direction of its own magnetization. This influence is given by:

$$\text{Formula 1}$$
$$\frac{\sigma_w}{2 \times M_S \text{ (saturated magnetic moment)} \times \text{film thickness } t}$$

In the two-layered film medium, conditions under which Condition 2 can be present in a (quasi) stable state at a room temperature $T_R$ are given by the following Formulas 2 to 4.

P type:
$$H_{C1} > H_{C2} + \frac{\sigma_w}{2M_{S1}t_1} + \frac{\sigma_w}{2M_{S2}t_2} \quad \text{(Formula 2)}$$

A type:
$$H_{C1} > H_{C2} + \left| \frac{\sigma_w}{2M_{S1}t_1} - \frac{\sigma_w}{2M_{S2}t_2} \right| \quad \text{(Formula 2)}$$

$$H_{C1} > \frac{\sigma_w}{2M_{S1}t_1} \quad \text{Formula 3}$$

$$H_{C2} > \frac{\sigma_w}{2M_{S2}t_2} \quad \text{Formula 4}$$

On the other hand, a formula for preventing the direction of magnetization of the first layer from being reversed by the first external field $H_{e1}$ is Formula 5-1:

P type:
$$H_{C1} - \frac{\sigma_w}{2M_{S1}t_1} > H_{e1} \quad \text{Formula 5-1}$$

A type:
$$H_{C1} + \frac{\sigma_w}{2M_{S1}t_1} > H_{e1} \quad \text{Formula 5-1}$$

A formula for reversing the direction of magnetization of the second layer by the first external field $H_{e1}$ is Formula 5-2:

$$H_{e1} > H_{C2} + \frac{\sigma_w}{2M_{S2}t_2} \quad \text{Formula 5-2}$$

When Formulas 5-1 and 5-2 are combined, we have:

P type:
$$H_{C1} - \frac{\sigma_w}{2M_{S1}t_1} > |H_{e1}| > H_{C2} + \frac{\sigma_w}{2M_{S2}t_2}$$

A type:
$$H_{C1} + \frac{\sigma_w}{2M_{S1}t_1} > |H_{e1}| > H_{C2} + \frac{\sigma_w}{2M_{S2}t_2}$$

Condition 2 is relatively stably (quasi-stably) present at the room temperature as long as Formulas 2 to 4 are satisfied. Condition 2 is relatively stable since it is unstable as compared to a case (Condition 1) without an interface magnetic wall.

When a laser beam at first level shown in FIG. 4 is radiated to locally heat the medium, the following formulas are simultaneously Satisfied considerably before the temperature of the irradiated portion reaches the Curie temperature $T_{C1}$ of the first layer. The lowest temperature at which the following formulas are satisfied will be referred to as a temperature $T_{LS}$ hereinafter.

$$H_{C1} < \frac{\sigma_w}{2M_{S1}t_1} \quad \text{Formula 6}$$

$$H_{C2} > \frac{\sigma_w}{2M_{S2}t_2} \quad \text{Formula 7}$$

As can be understood from Formulas 6 and 7, the direction of magnetization of the first layer is reversed to follow a stable direction with respect to the second layer (a parallel direction due to P type). As a result, the interface magnetic wall disappears. FIG. 2A shows this state as Condition 3.

Since the beam intensity is high, when the beam radiation continues, the medium temperature is further increased, and then exceeds the Curie temperature $T_{C1}$ of the first layer. Thus, the magnetization of the first layer disappears. FIG. 2A shows this state as Condition 4.

In Condition 4, when the beam radiation is stopped, or an irradiated portion is separated from the spot, the irradiated portion is naturally cooled, and the medium temperature begins to fall. The medium temperature then reaches the Curie temperature $T_{C1}$ of the first layer. When the medium temperature is decreased slightly below $T_{C1}$, magnetization appears in the first layer. In this case, the direction of magnetization of the first layer depends on the direction of magnetization of the second layer due to the exchange coupling force. That is, magnetization in a stable direction with respect to the direction of magnetization of the second layer appears in the first layer. At that temperature, if the medium is of P type, magnetization in a direction parallel to the direction of magnetization of the second layer appears in the first layer. If the medium is of A type, magnetization in a direction antiparallel to the direction of magnetization of the second layer appears in the first layer. FIG. 2A shows this state as Condition 5.

As can be understood from Condition 5, in a portion irradiated with the beam, the direction of magnetization of the first layer is aligned in an upward direction ↑, and an "upward ↑ mark $B_1$" is formed. This mark has no interface magnetic wall.

In contrast to this, in a portion on which no beam is radiated, the direction of magnetization of the first layer is left in a downward direction ↓ (corresponding to a mark $B_0$). An interface magnetic wall remains in this portion.

Therefore, when a laser beam is radiated on a track while being pulse-modulated according to binary information, marks $B_1$ according to the information can be intermittently formed on the first layer of the track. In this manner, recording is completed.

The principle of recording of the second aspect has been described. The above description has been made using the P type medium. The same applies to the A type medium. In the above description, a case has been exemplified wherein there is no compensation temperature between the room temperature and the Curie temperature in each of the first and second layers. However, the medium used in this invention may be a medium in which a compensation temperature is present between the room temperature and the Curie temperature. In this case, if the medium temperature exceeds the compensation temperature, the direction of magnetization is reversed, and P type is changed to A type, and vise versa. Therefore, a description thereof will be omitted here since it becomes more complicated.

According to the recording method (step 2) of this invention, recording (formation of marks $B_1$) can be executed by only radiating the beam at first level, and a conventional bias field $H_b$ can be omitted.

Recorded information remains in the first layer. Thus, a laser beam is radiated on the first layer, and information can be reproduced by utilizing the Kerr effect of light reflected by the first layer. In this case, the laser beam must have a low intensity for giving a temperature lower than $T_{LS}$ to the medium. When the medium temperature exceeds $T_{LS}$, the mark $B_0$ (a mark with an interface magnetic wall) is changed to the mark $B_1$, and as a result, recorded information is erased.

As can be understood from Condition 5, interface magnetic walls remain in portions on which no beam is radiated, and the state of the medium is relatively unstable (quasi-stable). Therefore, preservation stability is not satisfactory. When the laser beam intensity is increased to increase the C/N ratio in the reproduction mode, the medium temperature undesirably approaches $T_{LS}$. If the medium temperature reaches $T_{LS}$, as described above, a mark ⇓ with an interface magnetic wall is changed to mark ⇑ without an interface magnetic wall, and recorded information is erased.

In order to prevent this, the direction of magnetization of the second layer of only a mark ⇑ with an interface magnetic wall is reversed upon application of a weak second external field $H_{e2}$ having a direction opposite to that of the first external field $H_{e1}$, as shown in FIG. 2B.

As a result, the medium is set in Condition 6 shown in FIG. 2A.

The second external field $H_{e2}$ is a weak field satisfying Formula 8 since it must not reverse the direction of magnetization of the second layer of the marks ⇑ without interface magnetic walls:

$$-H_{C2} + \frac{\sigma_w}{2M_{S2}t_2} > H_{e2} > -H_{C2} - \frac{\sigma_w}{2M_{S2}t_2} \quad \text{Formula 8}$$

Since $H_{C1} > H_{C2}$ is originally satisfied, if Formula 8 is satisfied, $H_{C1} > |H_{e2}|$ is satisfied. Therefore, $H_{e2}$ will not reverse the direction of magnetization of the first layer.

As can be understood from Condition 6, information remains in both the first and second layers, and no interface magnetic wall is present between the two layers. For this reason, both the marks $B_0$ and $B_1$ are stable.

For this reason, no problem is posed even when the temperature of the magnetic thin film exceeds $T_{LS}$ upon application of a laser beam in the reproduction mode. In this case, the temperature of the film must be prevented from being increased beyond the Curie temperature $T_{C2}$ of the second layer. If the film is heated up to a temperature equal to or higher than the Curie temperature $T_{C2}$, information is erased. Since the Curie temperature $T_{C2}$ of the second layer is higher than that of the first layer, if a method of radiating a laser beam onto the second layer, and reproducing information based on light reflected by the second layer is employed, the beam intensity can be increased, thus increasing the C/N ratio.

In the modification of the second aspect of this invention, step 3 of applying $H_{e2}$ is added. Step 3 may be executed immediately before reproduction. The third aspect of this invention will be described below. The third aspect relates to a magnetooptical recording apparatus, and provides the following magnetooptical recording apparatus.

More specifically, there is provided a non-overwritable magnetooptical recording apparatus comprising:

(a) a magnetooptical recording medium including at least first and second exchange-coupled layers having perpendicular magnetic anisotrophy, the second layer having a Curie temperature at least as high as a Curie temperature of the first layer, a direction of magnetization of the second layer being capable of being aligned in a predetermined direction by an external magnetic field at a room temperature without changing a direction of magnetization of the first layer, the magnetization of the second layer being aligned in said predetermined direction and the magnetization of the first layer being aligned in a direction such that an interface magnetic wall is present between the first and second layers in at least each recording portion of the medium;

(b) means for rotating said medium;

(c) an optical head which radiates a light beam to said medium; and (d) modulation means which pulse-modulates intensity of the light beam from said optical head, in accordance with binary information to be recorded, between a first intensity level which imparts to a recording portion a temperature at least as high as the Curie temperature of said first layer and lower than the Curie temperature of said second layer and which thereby forms a mark having no interface magnetic wall between said first and second layers, and a second intensity level, including zero-level, which imparts to a recording portion a temperature lower than a lowest temperature at which said interface magnetic wall disappears, whereby said mark is not formed.

The fourth aspect of this invention also relates to a magnetooptical recording apparatus, and provides the following apparatus.

More specifically, there is provided a non-overwritable magnetooptical recording apparatus comprising:

(a) a magnetooptical recording medium including at least first and second exchange-coupled layers having perpendicular magnetic anisotrophy, the second layer having a Curie temperature higher than a Curie temperature of the first layer, a direction of magnetization of said second layer being capable of being aligned in a predetermined direction by an external magnetic field at a room temperature without changing a direction of magnetization of said first layer;

(b) means for rotating said medium;

(c) external magnetic field applying means which, in at least each recording portion of said medium, aligns the direction of magnetization of said second layer in a direction opposite to the predetermined direction at the room temperature without changing the direction of magnetization of said first layer;

(d) means which radiates to said medium a non-modulated laser beam at a predetermined intensity level that imparts to each recording portion a temperature at least as high as the Curie temperature of said first layer and lower than the Curie temperature of said second layer and which causes disappearance of an interface magnetic wall which may be present between said first and second layers;

(e) external magnetic field applying means which, in at least each recording portion of said medium, aligns the direction of magnetization of said second layer in the predetermined direction at the room temperature without changing the direction of magnetization of said first layer and which forms an interface magnetic wall between said first and second layers in at least each recording portion;

(f) means which radiates a further light beam to said medium; and (g) modulation means which pulse-modulates intensity of the further light beam, in accordance with binary information to be recorded, between a first intensity level which imparts to a recording portion a temperature at least as high as the Curie temperature of said first layer and lower than the Curie temperature of said second layer and which thereby forms a mark having no interface magnetic wall between said first and second layers, and a second intensity level, including zero-level, which imparts to a recording portion a temperature lower than a lowest temperature at which said interface magnetic wall between said first and second layers disappears, whereby said mark is not formed.

The fifth aspect of this invention also relates to a magnetooptical recording apparatus, and provides the following apparatus.

More specifically, there is provided a non-overwritable magnetooptical recording apparatus comprising:

(a) a magnetooptical recording medium including at least first and second exchange-coupled layers having perpendicular magnetic anisotrophy, the second layer having a Curie temperature higher than a Curie temperature of the first layer, a direction of magnetization of the second layer being capable of being aligned in a predetermined direction by an external magnetic field at a room temperature without changing a direction of magnetization of the first layer, the magnetization of the second layer being aligned in said predetermined direction and the magnetization of the first layer being aligned in a direction such that an interface magnetic wall is present between the first and second layers in at least each recording portion of the medium;

(b) means for rotating said medium;

(c) an optical head which radiates a light beam to said medium; and (d) modulation means which pulse-modulates intensity of the light beam from said optical head, in accordance with binary information to be recorded, between a first intensity level which imparts to a recording portion a temperature lower than the Curie temperature of said first layer and at least as high as a lowest temperature at which an interface magnetic wall between said first and second layers disappears and which thereby forms a mark having no interface magnetic wall between said first and second layers, and a second intensity level, including zero-level, which imparts to a recording portion a temperature lower than said lowest temperature at which said interface magnetic wall disappears, whereby said mark is not formed.

The sixth aspect of this invention also relates to a magnetooptical recording apparatus, and provides the following apparatus.

More specifically, there is provided a non-overwritable magnetooptical recording apparatus comprising:

(a) a magnetooptical recording medium including at least first and second exchange-coupled layers having perpendicular magnetic anisotrophy, the second layer having a Curie temperature higher than a Curie temperature of the first layer, a direction of magnetization of said second layer being capable of being aligned in a predetermined direction by an external magnetic field at a room temperature without changing a direction of magnetization of said first layer;

(b) means for rotating said medium;

(c) external magnetic field applying means which, in at least each recording portion of said medium, aligns the direction of magnetization of said second layer in a direction opposite to the predetermined direction at the room temperature without changing the direction of magnetization of said first layer;

(d) means which radiates to said medium a non-modulated laser beam at a predetermined intensity level that imparts to each recording portion a temperature at least as high as the Curie temperature of said first layer and lower than the Curie temperature of said second layer and which causes disappearance of an interface magnetic wall which may be present between said first and second layers;

(e) external magnetic field applying means which, in at least each recording portion of said medium, aligns the direction of magnetization of said second layer in the predetermined direction at the room temperature without changing the direction of magnetization of said first layer and which forms an interface magnetic wall between said first and second layers in at least each recording portion;

(f) means which radiates a further light beam to said medium; and (g) modulation means which pulse-modulates intensity of the further light beam, in accordance with binary information to be recorded, between a first intensity level which imparts to a recording portion a temperature lower than the Curie temperature of said first layer and at least as high as a lowest temperature at which an interface magnetic wall between the first and second layers disappears and which thereby forms a mark having no interface magnetic wall between said first and second layers, and a second intensity level, including zero-level, which imparts to a recording portion a temperature lower than said lowest temperature at which said interface magnetic wall disappears, whereby said mark is not formed.

In a modification of each of the third through sixth aspects, the following means is added to the corresponding apparatus:

an external field applying means which generates a magnetic field in a direction opposite to said predetermined direction and which causes any interface magnetic wall present between said first and second layers at a region between said mark and a neighboring such mark to disappear.

The first and second aspects of this invention described above will be described in detail below.

In step 1 of both the first and second aspects of this invention described above, a medium having the above-mentioned nature or performance, and which has already been set in a state wherein an interface magnetic wall is present between the first and second layers in at least a portion to be subjected to recording, is prepared.

Some preparation methods of media in a state with an interface magnetic wall will be described below.

Preparation Method A

In the case of a P type medium, an external field larger than $H_{C1}$ ($>H_{C2}$) is applied at a room temperature to align the directions of magnetization of the two layers in the predetermined direction (in this state, no interface magnetic wall is present between the two layers). Thereafter, the first external field $H_{e1}$ is applied to align the direction of magnetization of only the second layer in the opposite direction, thus setting a state wherein an interface magnetic wall is present between the first and second layers. This process may be executed for the entire medium, or may be executed for only a portion to be subjected to recording.

Preparation Method B

In the case of an A type medium, an external field larger than $H_{C1}$ ($>H_{C2}$) is applied at a room temperature to align the directions of magnetization of the two layers in the predetermined direction.

With only this process, a state wherein an interface magnetic wall is present between the two layers can be obtained.

This process may be executed for the entire medium, or may be executed for only a portion to be subjected to recording.

Preparation Method C

Since the method A or B described above requires a large external field, the above-mentioned method (A or B) is executed in a state wherein the entire medium is heated to decrease a coercivity.

Preparation Method D

First, a third external field $H_{e3}$ (satisfying the following formula) in the opposite direction is applied to a medium at a room temperature to align the direction of magnetization of the second layer in the opposite direction:

P type:

$$H_{C1} - \frac{\sigma_w}{2M_{S1}t_1} > |H_{e3}| > H_{C2} + \frac{\sigma_w}{2M_{S2}t_2}$$

A type:

$$H_{C1} + \frac{\sigma_w}{2M_{S1}t_1} > |H_{e3}| > H_{C2} + \frac{\sigma_w}{2M_{S2}t_2}$$

In this state, a magnetic wall may or may not be present between the two layers. However, whether the interface magnetic wall is present or not is unknown. In addition, a portion where the interface magnetic wall is present (or absent) is unknown.

Next, a laser beam at a third intensity level for giving, to the medium, a temperature lower than the Curie temperature of the second layer, and equal to or higher than the lowest temperature $T_{LS}$ for causing an interface magnetic wall between the first and second layers to disappear is radiated on the medium without being modulated, thereby causing an interface magnetic wall which may be present between the two layers to disappear.

The first external field $H_{e1}$ in the predetermined direction is then applied to the medium, thereby aligning the direction of magnetization of the second layer in the predetermined direction.

Thus, an interface magnetic wall is formed between the two layers.

This process may be executed for the entire medium, or may be executed for only a portion to be subjected to recording.

Preparation Method E

The medium temperature is increased to be equal to or higher than the Curie temperature $T_{C1}$ of the first layer by applying a non-modulated laser beam or heating the entire medium. Thus, the magnetization of the first layer disappears, and the coercivity $H_{C2}$ of the second layer is considerably decreased. In this state, when a fourth external field $H_{e4}$ (corresponding to a bias field Hb in the inventions of Japanese Laid-Open Patent Application No. 62-175948 and Japanese Laid-Open Patent Application No. 1-277349) is applied, since $H_{e4}>H_{C2}$ is satisfied, the direction of magnetization of the second layer follows $H_{e4}$. FIG. 5 shows this state as Condition 1.

When the beam radiation is stopped, or when the irradiated portion is separated from the beam spot, or when heating is stopped, Condition 1 is changed to Condition 7 (to be described later). However, when the beam radiation or heating continues, the medium temperature then exceeds the Curie temperature $T_{C2}$ of the second layer. Thus, the magnetization of the second layer also disappears, and Condition 2 shown in FIG. 5 is established.

When the beam radiation is stopped, or when the irradiated portion is separated from the beam spot, or when heating is stopped, the heated portion is naturally cooled, and the temperature of that portion is decreased to the room temperature.

When the medium temperature is decreased slightly below the Curie temperature $T_{C2}$, magnetization appears in the second layer. The direction of magnetization of the second layer follows the direction of the third external field $H_{e4}$. This state corresponds to Condition 3 in FIG. 5.

When the medium is further cooled, and the medium temperature is decreased below the Curie temperature $T_{C1}$ of the first layer, magnetization appears in the first layer. In this case, the direction of magnetization of the first layer is aligned in a stable direction with respect to the second layer upon reception of the exchange coupling force from the second layer. More specifically, the direction of magnetization of the first layer is aligned in the same direction as that of the second layer when the medium is of P type at a temperature at that time, or is aligned in the opposite direction when the medium is of A type. In the case of the P type medium, Condition 4 shown in FIG. 5 is established.

In a magnetic thin film which has a compensation temperature $T_{comp.}$ (to be described later) between the room temperature and the Curie temperature, when the medium temperature exceeds the compensation temperature, the direction of magnetization is reversed, and P type is changed to A type, and vice versa.

The directions of magnetization appearing in the first and second layers during a cooling process from the Curie temperatures may be reversed during a cooling process to the room temperature.

However, in any case, no interface magnetic wall is present between the two layers at the room temperature.

Finally, the first external field $H_{e1}$ in the predetermined direction is applied to the medium. Thus, the direction of magnetization of only the second layer can be aligned in the predetermined direction, and an interface magnetic wall is formed between the two layers. This state corresponds to condition 5 in FIG. 5.

Step 1 is completed in this manner. As can be understood from the above description, when the second layer has a compensation temperature $T_{comp.}$ between the room temperature and the Curie temperature, the first and fourth external fields $H_{e1}$ and $H_{e4}$ are applied in the same direction.

Description of Compensation Composition

When the materials of both the first and second layers are selected from the transition metal-heavy rare earth metal alloy compositions, the direction and level of magnetization appearing outside the alloys are determined by the relationship between the direction and level of spin of transition metal (to be abbreviated to as TM hereinafter) atoms, and those of heavy rare earth metal (to be abbreviated to as RE hereinafter) atoms inside the alloys. For example, the direction and level of TM spin are represented by a dotted vector ↑, those of RE spin are represented by a solid vector ↑, and the direction and level of magnetization of the entire alloy are represented by a double-solid vector ⇑. In this case, the vector ⇑ is expressed as a sum of the vectors ↑ and ↑. However, in the alloy, the vectors ↑ and ↑ are directed in the opposite directions due to the mutual effect of the TM spin and the RE spin. Therefore, when strengths of these vectors are equal to each other, the sum of ↑ and ↑ or the sum of ↓ and ↑ is zero (i.e., the level of magnetization appearing outside the alloy becomes zero). The alloy composition making the sum of vectors zero is called a compensation composition. When the alloy has another composition, it has a strength equal to a difference between the strengths of the two spins, and has a vector ( ⇑ or ⇓ ) having a direction equal to that of the larger vector. Magnetization of this vector appears outside the alloy. For example, ↑ ↑ appears as ⇑, and ↑ ↑ appears as ⇓.

When one of the strengths of the vectors of the RE and TM spins is larger than the other, the alloy composition is referred to as "oo rich" named after the larger spin name (e.g., RE rich).

Both the first and second layers can be classified into TM rich and RE rich compositions. Therefore, as shown in FIG. 6, when the composition of the first layer is plotted along the ordinate and that of the second layer is plotted along the abscissa, the types of medium as a whole can be classified into four quadrants. The P type medium described above belongs to Quadrants I and III, and the A type medium belongs to Quadrants II and IV.

In FIG. 6, the intersection of the abscissa and the ordinate represents the compensation composition of the two layers.

Description of Compensation Temperature

In view of a change in coercivity against a change in temperature, a given alloy composition has characteristics wherein the coercivity temporarily increases infinitely and then abruptly decreases before a temperature reaches the Curie temperature (at which the coercivity is zero). The temperature corresponding to the infinite coercivity is called a compensation temperature ($T_{comp.}$). No compensation temperature is present between the room temperature and the Curie temperature in the TM rich alloy composition. The compensation temperature below the room temperature is irrelevant in the magnetooptical recording, and hence, it is assumed in this specification that the compensation temperature is present between the room temperature and the Curie temperature.

If the first and second layers are classified in view of the presence/absence of the compensation temperature, the recording medium can be classified into four types. A medium in Quadrant I includes all the four types of media.

When the first and second layers are classified in view of their RE or TM rich characteristics and in view of the presence/absence of the compensation temperature, recording media can be classified into the following nine classes.

TABLE 1

| Class | | | Type |
|---|---|---|---|
| | Quadrant I (P type) | | |
| | First Layer: RE Rich | Second Layer: RE Rich | |
| 1 | $T_{comp.}$ | $T_{comp.}$ | 1 |
| 2 | No $T_{comp.}$ | $T_{comp.}$ | 2 |
| 3 | $T_{comp.}$ | No $T_{comp.}$ | 3 |
| 4 | No $T_{comp.}$ | No $T_{comp.}$ | 4 |
| | Quadrant II (A type) | | |
| | First Layer: RE Rich | Second Layer: TM Rich | |
| 5 | $T_{comp.}$ | No $T_{comp.}$ | 3 |
| 6 | No $T_{comp.}$ | No $T_{comp.}$ | 4 |
| | Quadrant III (P type) | | |
| | First Layer: TM Rich | Second Layer: TM Rich | |
| 7 | No $T_{comp.}$ | No $T_{comp.}$ | 4 |
| | Quadrant IV (A type) | | |
| | First Layer: TM Rich | Second Layer: RE Rich | |
| 8 | No $T_{comp.}$ | $T_{comp.}$ | 2 |
| 9 | No $T_{comp.}$ | No $T_{comp.}$ | 4 |

Detailed Description of the Principle of the First Aspect of the Invention

The principle of the first aspect of this invention will be described in detail below with reference to media in some classes classified as described above.

Description of Class 1

The principle of the first aspect of this invention will be described in detail below using a medium No. 1 belonging to a recording medium of Class 1 (P type, Quadrant I, Type 1) shown in Table 1.

The medium No. 1 has relations given by:

$$T_R < T_{comp.1} < T_{LS} < T_{C1} \leqq T_{C2} \text{ and } T_{comp.2} < T_{C1}$$

$T_{comp.2}$ may be higher than, equal to, or lower than $T_{LS}$. For the sake of simplicity, in the following description, $T_{LS} < T_{comp.2}$. Similarly, for the sake of simplicity, $T_{C1} < T_{C2}$. FIG. 7 is a graph showing the above-mentioned relations. Note that thin curves represent characteristics of the first layer, and bold curves represent characteristics of the second layer.

The medium No. 1 satisfies Formulas 2 to 4, and the direction of magnetization of only the second layer can be aligned in the predetermined direction ⇑ ( ↑ ⋮ ) by the first external field $H_{e1}$ satisfying Formula 5 while the direction of magnetization of the first layer is left unchanged.

Step 1. (Preparation Method D)

Step 1 will be described below with reference to FIG. 12.

The direction of magnetization of the second layer is aligned in the opposite direction ⇓ ( ↓ ⋮ ) by the third external field $H_{e3}$ satisfying the following formula:

$$H_{C2} + \frac{\sigma_w}{2M_{S2}t_2} < |H_{e3}| < H_{C1} - \frac{\sigma_w}{2M_{S1}t_1}$$

In this case, the first layer is set in one of Conditions 10a and 10b in FIG. 12 although its direction of magnetization is unknown. In the following drawings, a bold line between the first and second layers represents a magnetic wall.

A laser beam at the third intensity level for giving, to the medium, the temperature lower than the Curie temperature $T_{C2}$ of the second layer, and equal to or higher than the temperature $T_{LS}$ for causing the interface magnetic wall between the two layers to disappear is radiated without being modulated (i.e., in a DC ON state).

Thus, the medium temperature is increased, and initially exceeds $T_{comp.1}$. In this case, the medium type is changed from P type to A type. The relationship between strengths of RE and TM spins of the first layer is reversed although their directions are left unchanged. As a result, the direction of magnetization of the first layer is reversed (Condition 10a→Condition 11a, Condition 10b→Condition 11b).

The radiation of the laser beam continues, and the medium temperature then reaches $T_{LS}$. Thus, the following relations are satisfied:

$$H_{C1} < \frac{\sigma_w}{2M_{S1}t_1} \quad \text{Formula 6}$$

$$H_{C2} > \frac{\sigma_w}{2M_{S2}t_2} \quad \text{Formula 7}$$

As a result, the direction of magnetization of the first layer is aligned in a stable direction with respect to the direction of magnetization of the second layer. In other words, Condition 11a transits to Condition 12. On the other hand, since Condition 11b originally has a stable direction, it is left unchanged, and becomes the same condition as Condition 12.

When the irradiated portion falls outside a spot region of the laser beam in this state, the medium temperature begins to fall. When the medium temperature is decreased below $T_{comp.1}$, the medium type is restored from A type to original P type. The relationship between the strengths of the RE and TM spins of the first layer is reversed ( ↑ ⋮ → ↓ ⋮ ). As a result, the direction of magnetization of the first layer is aligned in the opposite direction ⇓ . This state corresponds to Condition 13.

Condition 13 is maintained after the medium temperature is decreased to the room temperature.

Assume that, after the medium temperature has reached $T_{LS}$, the temperature is further increased, and reaches a temperature $T_P$ ($T_P < T_{C2}$) beyond the Curie temperature $T_{C1}$ of the first layer. In this state, the magnetization of the first layer disappears, and Condition 12-2 is established.

When the irradiated portion falls outside a spot region of the laser beam in this state, the medium temperature begins to fall. When the medium temperature is decreased slightly below the Curie temperature $T_{C1}$ of the first layer, magnetization appears in the first layer. In this case, the direction of magnetization of the first layer is aligned in a stable direction (antiparallel direction) with respect to the second layer under the influence of the second layer via the exchange coupling force. This state corresponds to Condition 12-3.

Assume that the medium temperature is further decreased below $T_{comp.1}$. The medium type is then restored from A type to original P type. The relationship between the strengths of the RE and TM spins of the first layer is reversed ( ↑ ⋮ → ↓ ⋮ ). As a result, the direction of magnetization of the first layer is aligned in the opposite direction ⇓ . This state corresponds to Condition 12-4.

Condition 12-4 is the same as Condition 13. More specifically, ① even when the medium temperature is increased up to $T_{LS}$ as a peak temperature, and then begins to fall to the room temperature, or ② even when the medium temperature is increased up to the temperature $T_P$ equal to or higher than the Curie temperature $T_{C1}$ of the first layer and lower than the Curie temperature $T_{C2}$ of the second layer as a peak temperature, and then begins to fall to the room temperature, the same Condition 13 (=Condition 12-4) is consequently established. The process ① or ② depends on the third intensity level if the rotational speed (moving speed) of the medium remains the same. The same applies to media in subsequent Classes, and hence, a description when the medium temperature exceeds the Curie Temperature $T_{C1}$ will be omitted there.

In any case, a medium in which no interface magnetic wall is present between the two layers can be reliably obtained in this manner.

The first external field $H_{e1}$ in the predetermined direction ↑ is applied to this medium. Thus, Condition 14 is established without exceptions.

Step 1 is completed in this manner.

Step 2

Step 2 will be described below with reference to FIG. 13.

A laser beam which modulated in accordance with binary information to be recorded between the first intensity level for giving, to the medium, the temperature lower than the Curie temperature $T_{C1}$ of the first layer, and equal to or higher than the lowest temperature $T_{LS}$ for causing the interface magnetic wall between the two layers to disappear, and the second intensity level for giving, to the medium, a temperature lower than the temperature $T_{LS}$, is radiated on the relative-moving medium (Condition 14).

A case will be described below wherein the beam at the first level is radiated. Upon radiation of the beam, the medium temperature is increased, and exceeds $T_{comp.1}$. The medium type is then changed from P type to A type. The relationship between strengths of RE and TM spins of the first layer is reversed although their directions are left unchanged. As a result, the direction of magnetization of the first layer is reversed. This state corresponds to Condition 15.

The radiation of the laser beam continues, and the medium temperature then reaches $T_{LS}$. Thus, the following relations are satisfied:

$$H_{C1} < \frac{\sigma_w}{2M_{S1}t_1} \quad \text{Formula 6}$$

$$H_{C2} > \frac{\sigma_w}{2M_{S2}t_2} \quad \text{Formula 7}$$

As a result, the direction of magnetization of the first layer is aligned in a stable direction with respect to the direction of magnetization of the second layer. In this case, an interface magnetic wall disappears. Thus, Condition 15 transits to Condition 16.

When the irradiated portion falls outside a spot region of the laser beam in this state, the medium temperature begins to fall. When the medium temperature is decreased below $T_{comp.1}$, the medium type is restored from A type to original P type. The relationship between the strengths of the RE and TM spins of the first layer is reversed ( ↑ ⋮ → ↑ ⋮ ). As a result, the direction of magnetization of the first layer is reversed to the predetermined direction ⇩. This state corresponds to Condition 17.

Condition 17 is maintained after the medium temperature is decreased to the room temperature.

A case will be described below wherein the beam at the second level is radiated. In this case, since the medium temperature does not reach $T_{LS}$, the magnetic wall does not disappear. Therefore, even if the medium temperature exceeds $T_{comp.1}$ upon radiation of the beam, Condition 14 is restored after the beam radiation is stopped, and the medium temperature is returned to the room temperature.

Therefore, when the beam at the first level is radiated, a mark $B_1$ in Condition 17 is formed, and when the beam at the second level (including zero level) is radiated, Condition 14 (mark $B_0$) remains. As a result, information is recorded.

Class 4

The principle of the first aspect of this invention will be described in detail below using a medium No. 4 belonging to a recording medium of Class 4 (P type, Quadrant I, Type 4) shown in Table 1.

The medium No. 4 satisfies the following relation:

$$T_R < T_{LS} < T_{C1} \leq T_{C2}$$

For the sake of simplicity, in the following description, $T_{C1} < T_{C2}$. FIG. 8 is a graph showing this relation.

The medium No. 4 satisfies Formulas 2 to 4, and the direction of magnetization of only the second layer can be aligned in the predetermined direction ⇧ ( ↑ ⋮ ) by the first external field $H_{e1}$ satisfying Formula 5 while the direction of magnetization of the first layer is left unchanged.

Step 1 (Preparation Method A)

Step 1 will be described below with reference to FIG. 14.

Although the direction of magnetization of the medium is unknown now, when an external field larger than $$\left[ H_{C2} + \frac{\sigma_w}{2M_{S2}t_2} \right]$$

and in the opposite direction ↓ is applied, the directions of magnetization of the two layers are aligned in the opposite direction ↓. This state corresponds to Condition 40 in FIG. 14.

The first external field $H_{e1}$ satisfying Formula 5 is applied in the predetermined direction ↑. As a result, the direction of magnetization of only the second layer is aligned in the predetermined direction ⇧ ( ↑ ⋮ ) while the direction of magnetization of the first layer is left unchanged. This state corresponds to Condition 41.

Step 1 is completed in this manner.

Step 2

Step 2 will be described below with reference to FIG. 15.

A laser beam which modulated in accordance with binary information to be recorded between the first intensity level for giving, to the medium, the temperature lower than the Curie temperature $T_{C1}$ of the first layer, and equal to or higher than the lowest temperature $T_{LS}$ for causing the interface magnetic wall between the two layers to disappear, and the second intensity level for giving, to the medium, a temperature lower than the temperature $T_{LS}$, is radiated on the relative-moving medium (Condition 41).

A case will be described below wherein the beam at the first level is radiated. Upon radiation of the beam, the medium temperature is increased, and reaches $T_{LS}$. Thus, the following relations are satisfied:

$$H_{C1} < \frac{\sigma_w}{2M_{S1}t_1} \quad \text{Formula 6}$$

$$H_{C2} > \frac{\sigma_w}{2M_{S2}t_2} \quad \text{Formula 7}$$

As a result, the direction of magnetization of the first layer is aligned in a stable direction with respect to the direction of magnetization of the second layer. In this case, an interface magnetic wall disappears. This state corresponds to Condition 42.

When the irradiated portion falls outside a spot region of the laser beam in this state, the medium temperature begins to fall, Condition 42 is maintained after the medium temperature is decreased to the room temperature.

As a result, a bit in the predetermined direction ⇧ is formed in the first layer.

A case will be exemplified below wherein the beam at the second level is radiated. In this case, since the medium temperature does not reach $T_{LS}$, the interface magnetic wall does not disappear. Therefore, even if the medium temperature is increased more or less upon radiation of the beam, Condition 41 is restored after the beam radiation is stopped, and the medium temperature is returned to the room temperature.

Therefore, when the beam at the first level is radiated, a mark $B_1$ in Condition 42 is formed, and when the beam at the second level (including zero level) is radiated, Condition 41 (mark $B_0$) remains. As a result, information is recorded.

Description of Class 5

The principle of the first aspect of this invention will be described in detail below using a medium No. 5 belonging to a recording medium of Class 5 (A type, Quadrant II, Type 3) shown in Table 1.

The medium No. 5 satisfies a relation given by:

$$T_R < T_{comp.1} < T_{LS} < T_{C1} \leqq T_{C2}$$

For the sake of simplicity, in the following description, $T_{C1} < T_{C2}$. FIG. 9 is a graph showing the above-mentioned relation.

The medium No. 5 satisfies Formulas 2 to 4, and the direction of magnetization of only the second layer can be aligned in the predetermined direction ⇕ ( ↓ ⋮ ) by $H_{e1}$ satisfying Formula 5 while the direction of magnetization of the first layer is left unchanged.

Step 1 (Preparation Method D)

Step 1 by the preparation method D will be described below with reference to FIG. 12.

The direction of magnetization of the second layer is aligned in the opposite direction ⇕ ( ↓ ⋮ ) by the third external field $H_{e3}$ satisfying the following formula:

$$H_{C2} + \frac{\sigma_w}{2M_{S2}t_2} < |H_{e3}| < H_{C1} - \frac{\sigma_w}{2M_{S1}t_1}$$

In this case, the first layer is set in one of Conditions 50a and 50b in FIG. 16 since its direction of magnetization does not follow the direction of $H_{e3}$.

A laser beam at the third intensity level for giving, to the medium, the temperature lower than the Curie temperature $T_{C2}$ of the second layer, and equal to or higher than the temperature $T_{LS}$ for causing the interface magnetic wall between the two layers to disappear is radiated without being modulated (i.e., in a DC ON state).

Thus, the medium temperature is increased, and initially exceeds $T_{comp.1}$. In this case, the medium type is changed from A type to P type. The relationship between strengths of RE and TM spins of the first layer is reversed although their directions are left unchanged. As a result, the direction of magnetization of the first layer is reversed (Condition 50a→Condition 51a, Condition 50b→Condition 51b).

The radiation of the laser beam continues, and the medium temperature then reaches $T_{LS}$. Thus, the following relations are satisfied:

$$H_{C1} < \frac{\sigma_w}{2M_{S1}t_1} \qquad \text{Formula 6}$$

$$H_{C2} > \frac{\sigma_w}{2M_{S2}t_2} \qquad \text{Formula 7}$$

As a result, the direction of magnetization of the first layer is aligned in a stable direction (parallel direction) with respect to the direction of magnetization of the second layer. In other words, Condition 51a transits to Condition 52. On the other hand, since Condition 51b originally has a stable direction, it is left unchanged, and becomes the same condition as Condition 52.

When the irradiated portion falls outside a spot region of the laser beam in this state, the medium temperature begins to fall. When the medium temperature is decreased below $T_{comp.1}$, the medium type is restored from P type to original A type. The relationship between the strengths of the RE and TM spins of the first layer is reversed ( ↓ ⋮ → ↑ ⋮ ). As a result, the direction of magnetization of the first layer is aligned in the predetermined direction ⇑ . This state corresponds to Condition 53.

Condition 53 is maintained after the medium temperature is decreased to the room temperature.

As a result, a medium in which no interface magnetic wall is present between the two layers can be reliably obtained.

The first external field $H_{e1}$ in the predetermined direction ↑ is applied to this medium. Thus, Condition 54 is established without exceptions.

Step 1 is completed in this manner.

Another Step 1 (Preparation Method E)

Another step 1 by the preparation method E will be described below with reference to FIG. 17.

A medium in a free state is set in one of Conditions 55a to 55d shown in FIG. 17 at a room temperature.

A laser beam at the fourth level higher than the first level is radiated on the medium without being modulated (i.e., in a DC ON state).

Thus, the medium temperature is increased, and initially exceeds $T_{comp.1}$. In this case, the medium type is changed from A type to P type. The relationship between strengths of RE and TM spins of the first layer is reversed although their directions are left unchanged. As a result, the direction of magnetization of the first layer is reversed (Condition 55a→Condition 56a, Condition 55b→Condition 56b, Condition 55c→Condition 56c, Condition 55d→Condition 56d).

The radiation of the laser beam continues, and the medium temperature is increased to up $T_H$. Since $T_H$ is near the Curie temperature of the second layer, the coercivities of the two layers become small (in some cases, the coercivity $H_{C1}$ of the first layer becomes zero). As a result, the medium satisfies one of the following formulas:

$$|H_{C1} - H_{C2}| < \frac{\sigma_w}{2M_{S1}t_1} + \frac{\sigma_w}{2M_{S2}t_2} \qquad (1)$$

and $$Hb > \frac{M_{S1}t_1 H_{C1} + M_{S2}t_2 H_{C2}}{M_{S1}t_1 + M_{S2}t_2}$$

$$Hb > H_{C1} + \frac{\sigma_w}{2M_{S1}t_1} \qquad (2)$$

and $$Hb > H_{C2} - \frac{\sigma_w}{2M_{S2}t_2}$$

$$Hb > H_{C1} - \frac{\sigma_w}{2M_{S1}t_1} \qquad (3)$$

and

-continued $$Hb > H_{C2} + \frac{\sigma_w}{2M_{S2}t_2}$$

For this reason, the directions of magnetization of the two layers are reversed at almost the same time, and follow the direction of Hb ↑. This state corresponds to Condition 57.

When the medium in Condition 57 falls outside the spot region of the laser beam, the medium temperature begins to fall. When the medium temperature is decreased below $T_{comp.1}$, the medium type is restored from P type to original A type. The relationship between the strengths of the TM and RE spins of the first layer is reversed ( ↓ ⋮ → ↓ ⋮ ) For this reason, the direction of magnetization of the first layer is reversed to the opposite direction ⇓ (Condition 58).

The medium temperature is then decreased from the temperature in Condition 58 to the room temperature. $H_{C1}$ at the room temperature is sufficiently large, and the following formula can be satisfied:

$$Hb < H_{C1} + \frac{\sigma_w}{2M_{S1}t_1}$$

Therefore, the magnetization of the first layer is stably maintained in Condition 58.

As a result, a medium in which no interface magnetic wall is present between the two layers can be reliably obtained.

The first external field $H_{e1}$ in the predetermined direction ↑ is applied to this medium. Thus, Condition 59 is established without exceptions.

Step 1 is completed in this manner.

Step 2

Step 2 will be described below with reference to FIG. 18.

A laser beam which modulated in accordance with binary information to be recorded between the first intensity level for giving, to the medium, the temperature lower than the Curie temperature $T_{C1}$ of the first layer, and equal to or higher than the lowest temperature $T_{LS}$ for causing the interface magnetic wall between the two layers to disappear, and the second intensity level for giving, to the medium, a temperature lower than the temperature $T_{LS}$, is radiated on the relative-moving medium (Condition 54 or 49).

A case will be described below wherein the beam at the first level is radiated. Upon radiation of the beam, the medium temperature is increased, and exceeds $T_{comp.1}$. The medium type is then changed from P type to A type. The relationship between strengths of RE and TM spins of the first layer is reversed although their directions are left unchanged. As a result, the direction of magnetization of the first layer is reversed. This state corresponds to Condition 60.

The radiation of the laser beam continues, and the medium temperature then reaches $T_{LS}$. Thus, the following relations are satisfied:

$$H_{C1} < \frac{\sigma_w}{2M_{S1}t_1} \quad \text{Formula 6}$$

$$H_{C2} > \frac{\sigma_w}{2M_{S2}t_2} \quad \text{Formula 7}$$

As a result, the direction of magnetization of the first layer is aligned in a stable direction with respect to the direction of magnetization of the second layer. Thus, Condition 60 transits to Condition 61.

When the irradiated portion falls outside a spot region of the laser beam in this state, the medium temperature begins to fall. When the medium temperature is decreased below $T_{comp.1}$, the medium type is restored from A type to original P type. The relationship between the strengths of the RE and TM spins of the first layer is reversed ( ↑ ⋮ → ↑ ⋮ ). As a result, the direction of magnetization of the first layer is reversed to the predetermined direction ⇑. This state corresponds to Condition 62.

Condition 62 is maintained after the medium temperature is decreased to the room temperature.

A case will be described below wherein the beam at the second level is radiated. In this case, since the medium temperature does not reach $T_{LS}$, the interface magnetic wall does not disappear. Therefore, even if the medium temperature exceeds $T_{comp.1}$ upon radiation of the beam, Condition 59 is restored after the beam radiation is stopped, and the medium temperature is returned to the room temperature.

Therefore, when the beam at the first level is radiated, a mark $B_1$ in Condition 62 is formed, and when the beam at the second level (including zero level) is radiated, Condition 59 (mark $B_0$) remains. As a result, information is recorded.

Description of Class 7

The principle of the first aspect of this invention will be described in detail below using a medium No. 7 belonging to a recording medium of Class 7 (P type, Quadrant III, Type 4) shown in Table 1.

The medium No. 7 satisfies a relation given by:

$$T_R < T_{LS} < T_{C1} \leqq T_{C2}$$

For the sake of simplicity, in the following description, $T_{C1} < T_{C2}$. FIG. 10 is a graph showing the above-mentioned relation.

The medium No. 7 satisfies Formulas 2 to 4 at the room temperature, and the direction of magnetization of only the second layer can be aligned in the predetermined direction ⇑ ( ↑ ⋮ ) by $H_{e1}$ satisfying Formula 5 at the room temperature while the direction of magnetization of the first layer is left unchanged.

Step 1 (Preparation Method D)

Step 1 will be described below with reference to FIG. 19.

The direction of magnetization of the second layer is aligned in the opposite direction ⇓ ( ↓ ⋮ ) by the third external field $H_{e3}$ satisfying the following formula:

$$H_{C2} + \frac{\sigma_w}{2M_{S2}t_2} < |H_{e3}| < H_{C1} - \frac{\sigma_w}{2M_{S1}t_1}$$

In this case, the first layer is set in one of Conditions 70a and 70b in FIG. 19 since its direction of magnetization does not follow the direction of $H_{e3}$.

A laser beam at the third intensity level for giving, to the medium, the temperature lower than the Curie temperature $T_{C2}$ of the second layer, and equal to or higher than the lowest temperature $T_{LS}$ for causing the interface magnetic wall between the two layers to disappear is radiated without being modulated (i.e., in a DC ON state).

Thus, the medium temperature is increased, and then reaches $T_{LS}$. Thus, the following relations are satisfied:

$$H_{C1} < \frac{\sigma_w}{2M_{S1}t_1} \qquad \text{Formula 6}$$

$$H_{C2} > \frac{\sigma_w}{2M_{S2}t_2} \qquad \text{Formula 7}$$

As a result, the direction of magnetization of the first layer is aligned in a stable direction (parallel direction) with respect to the direction of magnetization of the second layer. In other words, Condition 70a transits to Condition 71. On the other hand, since Condition 70b originally has a stable direction, it is left unchanged, and becomes the same condition as Condition 71.

When the irradiated portion falls outside a spot region of the laser beam in this state, the medium temperature begins to fall. Condition 71 is maintained after the medium temperature is decreased to the room temperature.

As a result, a medium in which no interface magnetic wall is present between the two layers can be reliably obtained.

The first external field $H_{e1}$ in the predetermined direction ↑ is applied to this medium. Thus, Condition 72 is established without exceptions.

Step 1 is completed in this manner.

Step 2

Step 2 will be described below with reference to FIG. 20.

A laser beam which modulated in accordance with binary information to be recorded between the first intensity level for giving, to the medium, the temperature lower than the Curie temperature $T_{C1}$ of the first layer, and equal to or higher than the lowest temperature $T_{LS}$ for causing the magnetic wall between the two layers to disappear, and the second intensity level for giving, to the medium, a temperature lower than $T_{LS}$, is radiated on the relative-moving medium (Condition 72).

A case will be described below wherein the beam at the first level is radiated. Upon radiation of the beam, the medium temperature is increased, and then reaches $T_{LS}$. Thus, the following relations are satisfied:

$$H_{C1} < \frac{\sigma_w}{2M_{S1}t_1} \qquad \text{Formula 6}$$

$$H_{C2} > \frac{\sigma_w}{2M_{S2}t_2} \qquad \text{Formula 7}$$

As a result, the direction of magnetization of the first layer is aligned in a stable direction with respect to the direction of magnetization of the second layer. Thus, Condition 72 transits to Condition 73.

When the irradiated portion falls outside a spot region of the laser beam in this state, the medium temperature begins to fall. Condition 73 is maintained after the medium temperature is decreased to the room temperature.

A case will be described below wherein the beam at the second level is radiated. In this case, since the medium temperature does not reach $T_{LS}$, the interface magnetic wall does not disappear. Therefore, even if the medium temperature is increased more or less upon radiation of the beam, Condition 72 is restored after the beam radiation is stopped, and the medium temperature is returned to the room temperature.

Therefore, when the beam at the first level is radiated, a mark $B_1$ in Condition 73 is formed, and when the beam at the second level (including zero level) is radiated, Condition 72 (mark $B_0$) remains. As a result, information is recorded.

Description of Class 8

The principle of the first aspect of this invention will be described in detail below using a medium No. 8 belonging to a recording medium of Class 8 (A type, Quadrant IV, Type 2) shown in Table 1.

The medium No. 8 satisfies a relation given by:

$$T_R < T_{LS} < T_{C1} \leqq T_{C2}$$

For the sake of simplicity, in the following description, $T_{C1} < T_{C2}$. $T_{comp.2}$ may be lower than, equal to, or higher than $T_{LS}$ or $T_{C1}$. In the following description, for the sake of simplicity, $T_{LS} < T_{C1} < T_{comp.2}$. FIG. 11 is a graph showing the above-mentioned relation.

The medium No. 8 satisfies Formulas 2 to 4 at the room temperature, and the direction of magnetization of only the second layer can be aligned in the predetermined direction ⇑ ( ↑ ⋮ ) by $H_{e1}$ satisfying Formula 5 at the room temperature while the direction of magnetization of the first layer is left unchanged.

Step 1 (Preparation Method D)

Step 1 will be described below with reference to FIG. 21.

The direction of magnetization of the second layer is aligned in the opposite direction ⇓ ( ↓ ⋮ ) by the third external field $H_{e3}$ satisfying the following Formula 86:

$$H_{C2} + \frac{\sigma_w}{2M_{S2}t_2} < |H_{e3}| < H_{C1} - \frac{\sigma_w}{2M_{S1}t_1}$$

In this case, the first layer is set in one of Conditions 80a and 80b in FIG. 21 since its direction of magnetization does not follow the direction of $H_{e3}$.

A laser beam at the third intensity level for giving, to the medium, the temperature lower than the Curie temperature $T_{C2}$ of the second layer, and equal to or higher than the lowest temperature $T_{LS}$ for causing the interface magnetic wall between the two layers to disappear is radiated without being modulated (i.e., in a DC ON state).

Thus, the medium temperature is increased, and then reaches $T_{LS}$. Thus, the following relations are satisfied:

$$H_{C1} < \frac{\sigma_w}{2M_{S1}t_1} \qquad \text{Formula 6}$$

$$H_{C2} > \frac{\sigma_w}{2M_{S2}t_2} \qquad \text{Formula 7}$$

As a result, the direction of magnetization of the first layer is aligned in a stable direction (parallel direction) with respect to the direction of magnetization of the second layer. In other words, Condition 80a transits to Condition 81. On the other hand, since Condition 80b originally has a stable direction, it is left unchanged, and becomes the same condition as Condition 81.

When the irradiated portion falls outside a spot region of the laser beam in this state, the medium temperature begins to fall. Condition 81 is maintained after the medium temperature is decreased to the room temperature.

As a result, a medium in which no interface magnetic wall is present between the two layers can be reliably obtained.

The first external field $H_{e1}$ in the predetermined direction ↑ is applied to this medium. Thus, Condition 82 is established without exceptions.

This condition is maintained after the influence of $H_{e1}$ disappears, and step 1 is completed.

Step 2

Step 2 will be described below with reference to FIG. 22.

A laser beam which modulated in accordance with binary information to be recorded between the first intensity level for giving, to the medium, the temperature lower than the Curie temperature $T_{C1}$ of the first layer, and equal to or higher than the lowest temperature $T_{LS}$ for causing the interface magnetic wall between the two layers to disappear, and the second intensity level for giving, to the medium, a temperature lower than $T_{LS}$, is radiated on the relative-moving medium (Condition 82).

A case will be described below wherein the beam at the first level is radiated. Upon radiation of the beam, the medium temperature is increased, and then reaches $T_{LS}$. Thus, the following relations are satisfied:

$$H_{C1} < \frac{\sigma_w}{2M_{S1}t_1} \quad \text{Formula 6}$$

$$H_{C2} > \frac{\sigma_w}{2M_{S2}t_2} \quad \text{Formula 7}$$

As a result, the direction of magnetization of the first layer is aligned in a stable direction with respect to the direction of magnetization of the second layer. Thus, Condition 82 transits to Condition 83.

When the irradiated portion falls outside a spot region of the laser beam in this state, the medium temperature begins to fall. Condition 83 is maintained after the medium temperature is decreased to the room temperature.

A case will be described below wherein the beam at the second level is radiated. In this case, since the medium temperature does not reach $T_{LS}$, the interface magnetic wall does not disappear. Therefore, even if the medium temperature is increased more or less upon radiation of the beam, Condition 82 is restored after the beam radiation is stopped, and the medium temperature is returned to the room temperature.

Therefore, when the beam at the first level is radiated, a mark $B_1$ in Condition 83 is formed, and when the beam at the second level (including zero level) is radiated, Condition 82 (mark $B_0$) remains. As a result, information is recorded.

Detailed Description of the Principle of the Second Aspect of the Invention

The principle of the second aspect of this invention will be described in detail below with reference to media in some classes. Note that step 1 of preparing a medium in a state with a magnetic wall is the same as that in the first aspect, and a detailed description thereof will be omitted. Only step 2 will be described below.

Description of Class 1

The principle of the second aspect of this invention will be described in detail below using a medium No. 1 belonging to a recording medium of Class 1 (P type, Quadrant I, Type 1) shown in Table 1.

Step 1

The same process as in step 1 of the first aspect of this invention is performed for a medium of Class 1 to prepare a medium in Condition 14 in FIG. 12.

Step 2

Step 2 will be described below with reference to FIG. 23.

A laser beam which modulated in accordance with binary information to be recorded between the first intensity level for giving, to the medium, the temperature equal to or higher than the Curie temperature $T_{C1}$ of the first layer, and lower than the Curie temperature $T_{C2}$ of the second layer, and the second intensity level for giving, to the medium, a temperature lower than the lowest temperature $T_{LS}$ for causing the interface magnetic wall between the first and second layers to disappear, is radiated on the relative-moving medium (Condition 14).

A case will be described below wherein the beam at the first level is radiated. Upon radiation of the beam, the medium temperature is increased, and exceeds $T_{comp.1}$. The medium type is then changed from P type to A type. The relationship between strengths of RE and TM spins of the first layer is reversed although their directions are left unchanged. As a result, the direction of magnetization of the first layer is reversed. This state corresponds to Condition 15.

The radiation of the laser beam continues, and the medium temperature then reaches $T_{LS}$. Thus, the following relations are satisfied:

$$H_{C1} < \frac{\sigma_w}{2M_{S1}t_1} \quad \text{Formula 6}$$

$$H_{C2} > \frac{\sigma_w}{2M_{S2}t_2} \quad \text{Formula 7}$$

As a result, the direction of magnetization of the first layer is aligned in a stable direction with respect to the direction of magnetization of the second layer. In this case, an interface magnetic wall disappears. Thus, Condition 15 transits to Condition 16.

Since the beam intensity is high, when the beam radiation continues, the medium temperature is further increased, and then exceeds the Curie temperature $T_{C1}$ of the first layer. Thus, the magnetization of the first layer disappears. This state corresponds to Condition 17.

When the irradiated portion falls outside a spot region of the laser beam in this state, the medium is naturally cooled, and the medium temperature begins to fall. When the medium temperature is decreased slightly below $T_{C1}$, magnetization appears in the first layer. In this case, the direction of magnetization of the first layer depends on that of the second layer due to the exchange coupling force. More specifically, magnetization in a stable direction (a direction not to form an interface magnetic wall) with respect to the direction of magnetization of the second layer appears in the first layer. Since the medium is of A type now, magnetization in a direction antiparallel to the direction of magnetization of the second layer appears in the first layer. This state corresponds to Condition 18.

When the medium is further cooled, and the medium temperature is decreased below $T_{comp.1}$, the medium type is restored from A type to original P type. The relationship between the strengths of the RE and TM spins of the first layer is reversed ( ↑ ⋮ → ↑ ⋮ ). As a result, the direction of magnetization of the first layer is reversed to the predetermined direction ⇧ . This state corresponds to Condition 19.

Condition 19 is maintained after the medium temperature is decreased to the room temperature.

A case will be described below wherein the beam at the second level is radiated. In this case, since the medium temperature does not reach $T_{LS}$, the interface magnetic wall does not disappear. Therefore, even if the medium temperature exceeds $T_{comp.1}$ upon radiation of the beam, Condition 14 is restored after the beam radiation is stopped, and the medium temperature is returned to the room temperature.

Therefore, when the beam at the first level is radiated, a mark $B_1$ in Condition 19 is formed, and when the beam at the second level (including zero level) is radiated, Condition 14 (mark $B_0$) remains. As a result, information is recorded.

Class 4

The principle of the second aspect of this invention will be described in detail below using a medium No. 4 belonging to a recording medium of Class 4 (P type, Quadrant I, Type 4) shown in Table 1.

Step 1

The same process as in step 1 of the first aspect of this invention is performed for a medium of Class 4 to prepare a medium in Condition 41 in FIG. 14.

Step 2

Step 2 will be described below with reference to FIG. 24.

A laser beam which modulated in accordance with binary information to be recorded between the first intensity level for giving, to the medium, the temperature equal to or higher than the Curie temperature $T_{C1}$ of the first layer, and the second intensity level for giving, to the medium, a temperature lower than the lowest temperature $T_{LS}$ for causing the interface magnetic wall between the first and second layers to disappear, is radiated on the relative-moving medium (Condition 41).

A case will be described below wherein the beam at the first level is radiated. Upon radiation of the beam, the medium temperature is increased, and then reaches $T_{LS}$. Thus, the following relations are satisfied:

$$H_{C1} < \frac{\sigma_w}{2M_{S1}t_1}$$ Formula 6

$$H_{C2} > \frac{\sigma_w}{2M_{S2}t_2}$$ Formula 7

As a result, the direction of magnetization of the first layer is aligned in a stable direction with respect to the direction of magnetization of the second layer. In this case, an interface magnetic wall disappears. This state corresponds to Condition 42.

Since the beam intensity is high, when the beam radiation continues, the medium temperature is further increased, and then exceeds the Curie temperature $T_{C1}$ of the first layer. Thus, the magnetization of the first layer disappears. This state corresponds to Condition 43.

When the irradiated portion falls outside a spot region of the laser beam in this state, the medium is naturally cooled, and the medium temperature begins to fall. When the medium temperature is decreased slightly below $T_{C1}$, magnetization appears in the first layer. In this case, the direction of magnetization of the first layer depends on that of the second layer due to the exchange coupling force. More specifically, magnetization in a stable direction (a direction not to form an interface magnetic wall) with respect to the direction of magnetization of the second layer appears in the first layer. Since the medium is of P type now, magnetization in a direction parallel to the direction of magnetization of the second layer appears in the first layer. This state corresponds to Condition 44.

Condition 44 is maintained after the medium temperature is decreased to the room temperature. As a result, a mark in the predetermined direction ⇧ is formed in the first layer.

A case will be described below wherein the beam at the second level is radiated. In this case, since the medium temperature does not reach $T_{LS}$, the interface magnetic wall does not disappear. Therefore, even if the medium temperature is increased more or less upon radiation of the beam, Condition 41 is restored after the beam radiation is stopped, and the medium temperature is returned to the room temperature.

Therefore, when the beam at the first level is radiated, a mark $B_1$ in Condition 44 is formed, and when the beam at the second level (including zero level) is radiated, Condition 41 (mark $B_0$) remains. As a result, information is recorded.

Description of Class 5

The principle of the second aspect of this invention will be described in detail below using a medium No. 5 belonging to a recording medium of Class 5 (A type, Quadrant II, Type 3) shown in Table 1.

Step 1

The same process as in step 1 of the first aspect of this invention is performed for a medium of Class 5 to prepare a medium in Condition 54 in FIG. 16 or in Condition 59 in FIG. 17.

Step 2

Step 2 will be described below with reference to FIG. 25.

A laser beam which modulated in accordance with binary information to be recorded between the first intensity level for giving, to the medium, the temperature equal to or higher than the Curie temperature $T_{C1}$ of the first layer, and the second intensity level for giving, to the medium, a temperature lower than the lowest temperature $T_{LS}$ for causing the interface magnetic wall between the first and second layers to disappear, is radiated on the relative-moving medium (condition 54 or 59).

A case will be described below wherein the beam at the first level is radiated. Upon radiation of the beam, the medium temperature is increased, and exceeds $T_{comp.1}$. The medium type is then changed from P type to A type. The relationship between strengths of RE and TM spins of the first layer is reversed although their directions are left unchanged. As a result, the direction of magnetization of the first layer is reversed. This state corresponds to Condition 60.

The radiation of the laser beam continues, and the medium temperature then reaches $T_{LS}$. Thus, the following relations are satisfied:

$$H_{C1} < \frac{\sigma_w}{2M_{S1}t_1} \quad \text{Formula 6}$$

$$H_{C2} > \frac{\sigma_w}{2M_{S2}t_2} \quad \text{Formula 7}$$

As a result, the direction of magnetization of the first layer is aligned in a stable direction with respect to the direction of magnetization of the second layer. That is, Condition 60 transits to Condition 61.

Since the beam intensity is high, when the beam radiation continues, the medium temperature is further increased, and then exceeds the Curie temperature $T_{C1}$ of the first layer. Thus, the magnetization of the first layer disappears. This state corresponds to Condition 62.

When the irradiated portion falls outside a spot region of the laser beam in this state, the medium is naturally cooled, and the medium temperature begins to fall. When the medium temperature is decreased slightly below $T_{C1}$, magnetization appears in the first layer. In this case, the direction of magnetization of the first layer depends on that of the second layer due to the exchange coupling force. More specifically, magnetization in a stable direction (a direction not to form an interface magnetic wall) with respect to the direction of magnetization of the second layer appears in the first layer. Since the medium is of A type now, magnetization in a direction antiparallel to the direction of magnetization of the second layer appears in the first layer. This state corresponds to Condition 63.

When the medium is further cooled, and the medium temperature is decreased below $T_{comp.1}$, the medium type is restored from A type to original P type. The relationship between the strengths of the RE and TM spins of the first layer is reversed ( ↑ ⋮ → ↑ ⋮ ). As a result, the direction of magnetization of the first layer is reversed to the predetermined direction ⇑. This state corresponds to Condition 64.

Condition 64 is maintained after the medium temperature is decreased to the room temperature.

A case will be described below wherein the beam at the second level is radiated. In this case, since the medium temperature does not reach $T_{LS}$, the interface magnetic wall does not disappear. Therefore, even if the medium temperature exceeds $T_{comp.1}$ upon radiation of the beam, Condition 59 is restored after the beam radiation is stopped, and the medium temperature is returned to the room temperature.

Therefore, when the beam at the first level is radiated, a mark $B_1$ in Condition 64 is formed, and when the beam at the second level (including zero level) is radiated, Condition 59 (mark $B_0$) remains. As a result, information is recorded.

Description of Class 7

The principle of the second aspect of this invention will be described in detail below using a medium No. 7 belonging to a recording medium of Class 7 (P type, Quadrant III, Type 4) shown in Table 1.

Step 1

The same process as in step 1 of the first aspect of this invention is performed for a medium of Class 7 to prepare a medium in Condition 72 in FIG. 19.

Step 2

Step 2 will be described below with reference to FIG. 26.

A laser beam which modulated in accordance with binary information to be recorded between the first intensity level for giving, to the medium, the temperature equal to or higher than the Curie temperature $T_{C1}$ of the first layer, and the second intensity level for giving, to the medium, a temperature lower than the lowest temperature $T_{LS}$ for causing the interface magnetic wall between the first and second layers to disappear, is radiated on the relative-moving medium (Condition 72).

A case will be described below wherein the beam at the first level is radiated. Upon radiation of the beam, the medium temperature is increased, and then reaches $T_{LS}$. Thus, the following relations are satisfied:

$$H_{C1} < \frac{\sigma_w}{2M_{S1}t_1} \quad \text{Formula 6}$$

$$H_{C2} > \frac{\sigma_w}{2M_{S2}t_2} \quad \text{Formula 7}$$

As a result, the direction of magnetization of the first layer is aligned in a stable direction with respect to the direction of magnetization of the second layer. That is, Condition 72 transits to Condition 73.

Since the beam intensity is high, when the beam radiation continues, the medium temperature is further increased, and then exceeds the Curie temperature $T_{C1}$ of the first layer. Thus, the magnetization of the first layer disappears. This state corresponds to Condition 74.

When the irradiated portion falls outside a spot region of the laser beam in this state, the medium is naturally cooled, and the medium temperature begins to fall. When the medium temperature is decreased slightly below $T_{C1}$, magnetization appears in the first layer. In this case, the direction of magnetization of the first layer depends on that of the second layer due to the exchange coupling force. More specifically, magnetization in a stable direction (a direction not to form an interface magnetic wall) with respect to the direction of magnetization of the second layer appears in the first layer. Since the medium is of P type now, magnetization in a direction parallel to the direction of magnetization of the second layer appears in the first layer. This state corresponds to Condition 75.

Condition 75 is maintained after the medium temperature is decreased to the room temperature.

A case will be described below wherein the beam at the second level is radiated. In this case, since the medium temperature does not reach $T_{LS}$, the interface magnetic wall does not disappear. Therefore, even if the medium temperature is increased more or less upon radiation of the beam, Condition 72 is restored after the beam radiation is stopped, and the medium temperature is returned to the room temperature.

Therefore, when the beam at the first level is radiated, a mark $B_1$ in Condition 75 is formed, and when the beam at the second level (including zero level) is radiated, Condition 72 (mark $B_0$) remains. As a result, information is recorded.

Description of Class 8

The principle of the second aspect of this invention will be described in detail below using a medium No. 8 belonging to a recording medium of Class 8 (A type, Quadrant IV, Type 2) shown in Table 1.

Step 1

The same process as in step 1 of the first aspect of this invention is performed for a medium of Class 8 to prepare a medium in Condition 82 in FIG. 21.

Step 2

Step 2 will be described below with reference to FIG. 27.

A laser beam which modulated in accordance with binary information to be recorded between the first intensity level for giving, to the medium, the temperature equal to or higher than the Curie temperature $T_{C1}$ of the first layer, and the second intensity level for giving, to the medium, a temperature lower than the lowest temperature $T_{LS}$ for causing the interface magnetic wall between the first and second layers to disappear, is radiated on the relative-moving medium (Condition 82).

A case will be described below wherein the beam at the first level is radiated. Upon radiation of the beam, the medium temperature is increased, and then reaches $T_{LS}$. Thus, the following relations are satisfied:

$$H_{C1} < \frac{\sigma_w}{2M_{S1}t_1} \quad \text{Formula 6}$$

$$H_{C2} > \frac{\sigma_w}{2M_{S2}t_2} \quad \text{Formula 7}$$

As a result, the direction of magnetization of the first layer is aligned in a stable direction with respect to the direction of magnetization of the second layer. That is, Condition 82 transits to Condition 83.

Since the beam intensity is high, when the beam radiation continues, the medium temperature is further increased, and then exceeds the Curie temperature $T_{C1}$ of the first layer. Thus, the magnetization of the first layer disappears. This state corresponds to Condition 84.

When the irradiated portion falls outside a spot region of the laser beam in this state, the medium is naturally cooled, and the medium temperature begins to fall. When the medium temperature is decreased slightly below $T_{C1}$, magnetization appears in the first layer. In this case, the direction of magnetization of the first layer depends on that of the second layer due to the exchange coupling force. More specifically, magnetization in a stable direction (a direction not to form an interface wall) with respect to the direction of magnetization of the second layer appears in the first layer. Since the medium is of A type now, magnetization in a direction antiparallel to the direction of magnetization of the second layer appears in the first layer. This state corresponds to Condition 85.

Condition 85 is maintained after the medium temperature is decreased to the room temperature.

A case will be described below wherein the beam at the second level is radiated. In this case, since the medium temperature does not reach $T_{LS}$, the interface magnetic wall does not disappear. Therefore, even if the medium temperature is increased more or less upon radiation of the beam, Condition 82 is restored after the beam radiation is stopped, and the medium temperature is returned to the room temperature.

Therefore, when the beam at the first level is radiated, a mark $B_1$ in Condition 85 is formed, and when the beam at the second level (including zero level) is radiated, Condition 82 (mark $B_0$) remains. As a result, information is recorded.

DETAILED DESCRIPTION OF THE PREFERRED EMBODIMENTS

This invention will be described in detail below by way of its reference examples and examples. However, this invention is not limited to these.

REFERENCE EXAMPLE 1

Manufacture of Recording Medium of Class 9

A 3-element RF magnetron sputtering apparatus is used, and targets (two targets, i.e., a TbFeCo alloy and a TbCo alloy) shown in Table 2 below are set.

A glass substrate having a thickness of 1.2 mm, and a diameter of 200 mm is set in a chamber of the apparatus. After the interior of the chamber of the apparatus is temporarily evacuated to a vacuum equal to or lower than $7 \times 10^{-7}$ Torr., Ar gas. is introduced to $5 \times 10^{-3}$ Torr. Sputtering is then performed at a deposition rate of about 2 Å/sec.

With this process, a first layer having a thickness $t_1 = 400$ Å, and a composition of $Tb_{21}Fe_{70}Co_9$ (suffixes are in units of atom. %; the same applies to the following description) is formed on the substrate, and a second layer having a thickness $t_2 = 500$ Å, and a composition of $Tb_{27}Co_{73}$ is formed on the first layer. In this manner, a medium No. 9 belonging to Class 9 (A type, Quadrant IV, Type 4) is manufactured.

The manufacturing conditions and characteristics of this medium are summarized in Table 2 below.

TABLE 2

|  | First Layer | Second Layer |
| --- | --- | --- |
| Composition | $Tb_{21}Fe_{70}Co_9$ | $Tb_{27}Co_{73}$ |
| Film Thickness t (Å) | 400 | 500 |
| $M_S$ (emu/cc) | 60 | 200 |
| $H_C$ (Oe) | 15,000 | 3,000 |
| $T_C$ (°C.) | 230 | >350 |
| $T_{comp.}$ (°C.) | None | None |
| $\sigma_w$ (room temperature) | 4 erg/cm² | |
| $T_{LS}$ (°C.) | 140° C. | |

This medium satisfies Formula 2:

$$H_{C1} = 15,000\ Oe > H_{C2} + \left| \frac{\sigma_w}{2M_{S1}t_1} - \frac{\sigma_w}{2M_{S2}t_2} \right|$$
$$= 9,333\ Oe$$

This medium also satisfies Formula 3:

$$H_{C1} = 15,000\ Oe > \frac{\sigma_w}{2M_{S1}t_1} = 8,333\ Oe$$

and Formula 4:

$$H_{C2} = 3,000\ Oe > \frac{\sigma_w}{2M_{S2}t_2} = 2,000\ Oe$$

For this reason, the direction of magnetization of only the second layer can be aligned in the predetermined direction by an external field at a room temperature while the direction of magnetization of the first layer is left unchanged. The aligned state is maintained even after the external field is removed.

On the other hand, this medium satisfies:

$$H_{C2} + \frac{\sigma_w}{2M_{S2}t_2} = 5,000\ Oe$$

$$H_{C1} - \frac{\sigma_w}{2M_{S1}t_1} = 6,667\ Oe$$

Therefore, if the first external field $H_{e1}$ is set to be, e.g., 6,000 Oe, Formula 5 can be satisfied. As a result, the direction of magnetization of only the second layer is reversed by $H_{e1}$ at the room temperature while the direction of magnetization of the first layer is not reversed.

REFERENCE EXAMPLE 2

Magnetooptical Recording/reproduction Apparatus

Figure 30:
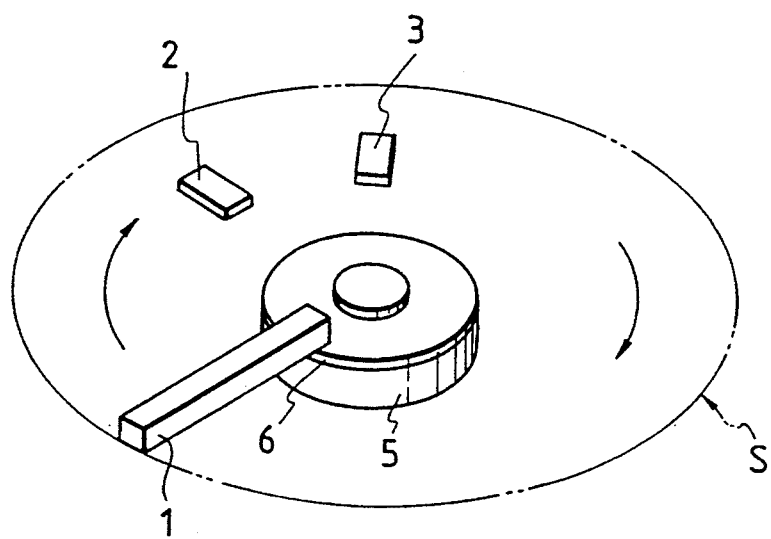
FIG. 30 is a schematic perspective view of a magnetooptical recording/reproduction apparatus of Reference Example 2.

FIG. 30 is a schematic perspective view of a magnetooptical recording/reproduction apparatus. This apparatus includes a magnetic field (6,000 Oe) applying means 1 used common to the first and third external fields $H_{e1}$ and $H_{e3}$, a recording optical head 2, a reproduction optical head 3, a spindle motor 5 for rotating a recording medium (S), and a spindle head 6 for chucking the recording medium (S).

EXAMPLE 1

Magnetooptical Recording According to the First Aspect of This Invention

In the magnetooptical recording/reproduction apparatus of Reference Example 2, the magnetic field applying means 1 was set to direct in the opposite direction ↓, so that a magnetic field of 6,000 Oe was applied in the opposite direction ↓ onto the film surface of the recording medium (S).

Step 1 (Preparation Method D)

The disk-like recording medium (S) was chucked on the spindle head 6, and was rotated by the motor 5 at a speed of 4,800 rpm.

A head driving system was set so that both the recording and reproduction optical heads 2 and 3 tracked a position corresponding to a radius r=30 mm.

The medium (S) passes below the magnetic field applying means 1 to receive the magnetic field ↓ ($H_{e3}$=6,000 Oe), and the direction of magnetization of only the second layer is aligned in the opposite direction. This state is maintained after the influence of $H_{e3}$ disappears. The direction of magnetization of the first layer is unknown now since it is left unchanged. However, since the direction of magnetization is one of the predetermined direction ⇑ and the opposite direction ⇓, the present state is as shown in Condition 100 in FIG. 28. Since the medium is of A type, an interface magnetic wall is formed in a portion where the directions of magnetization of the first and second layers are parallel to each other. Then, a beam emitted from the recording optical head 2 was radiated on the medium (S) at an intensity of the third intensity level=10 mW (on the magnetic thin film surface) without being modulated. Thus, the medium temperature is increased to 140° C., and Formulas 6 and 7 are satisfied. Values in these formulas are in units of Oe.

$$H_{C1} = 1,000 < \frac{\sigma_w}{2M_{S1}t_1} = 1,200 \quad \text{Formula 6}$$

$$H_{C2} = 14,000 > \frac{\sigma_w}{2M_{S2}t_2} = 10,000 \quad \text{Formula 7}$$

As a result, the direction of magnetization of the first layer in the portion with the interface magnetic wall is reversed to a stable direction (in this case, an antiparallel direction) with respect to the direction of magnetization of the second layer, and at the same time, the interface magnetic wall disappears. The direction of magnetization of the first layer in a portion without an interface magnetic wall is left unchanged since it is originally a stable direction (antiparallel direction) with respect to the direction of magnetization of the second layer. Therefore, the present state corresponds to Condition 101 in FIG. 28.

The driving operation of the apparatus was stopped, and the direction of the magnetic field applying means 1 was reversed. The driving operation of the apparatus was then restarted. In this case, the medium (S) passes below the magnetic field applying means 1 to receive a magnetic field ($H_{e1}$=6,000 Oe) in the predetermined direction T, and the direction of magnetization of only the second layer is aligned in the predetermined direction. This state is maintained after the influence of $H_{e1}$ disappears. Therefore, the direction of magnetization of the medium (S) is as shown in Condition 102 in FIG. 28.

In this manner, step 1 was completed.

Step 2

The apparatus used in step 1 was used. A laser beam which was emitted from the recording optical head 2, and was pulse-modulated according to standard information (10 MHz) was radiated on the medium (S) rotated at the same rotational speed. The beam intensity was set to have the first intensity level=10 mW (on the magnetic thin film surface) in the high level mode, and to have the second intensity level=1 mW (on the magnetic thin film surface) in the low level mode. In the low level mode, the beam was turned on at 1 mW as a tracking or focusing beam although it can have zero intensity.

As a result, an interface magnetic wall disappears in a portion irradiated with the beam at the first intensity level, and at the same time, the direction of magnetization of the first layer is reversed to the opposite direction ↑. Thus, marks $B_1$ (length=0.75 μm) having magnetization in the opposite direction ↑ were formed at 0.75-μm intervals. This state corresponds to Condition 103 in FIG. 28.

REFERENCE EXAMPLE 3

Reproduction

The apparatus used in step 2 was used. A laser beam emitted from the reproduction optical head 3 was radiated on the first layer while the medium (S) was rotated at the same rotational speed, and information was magnetooptically reproduced from light reflected by the first layer. The beam intensity was 1 mW (on the magnetic thin film surface).

As a result, the standard information (10 MHz) was reproduced, and a C/N ratio at that time was 54 dB.

EXAMPLE 2

Magnetooptical Recording According to the First Aspect of This Invention

Step 1

Same as Example 1.

Step 2

Same as Example 1.

Step 3

Figure 1A:
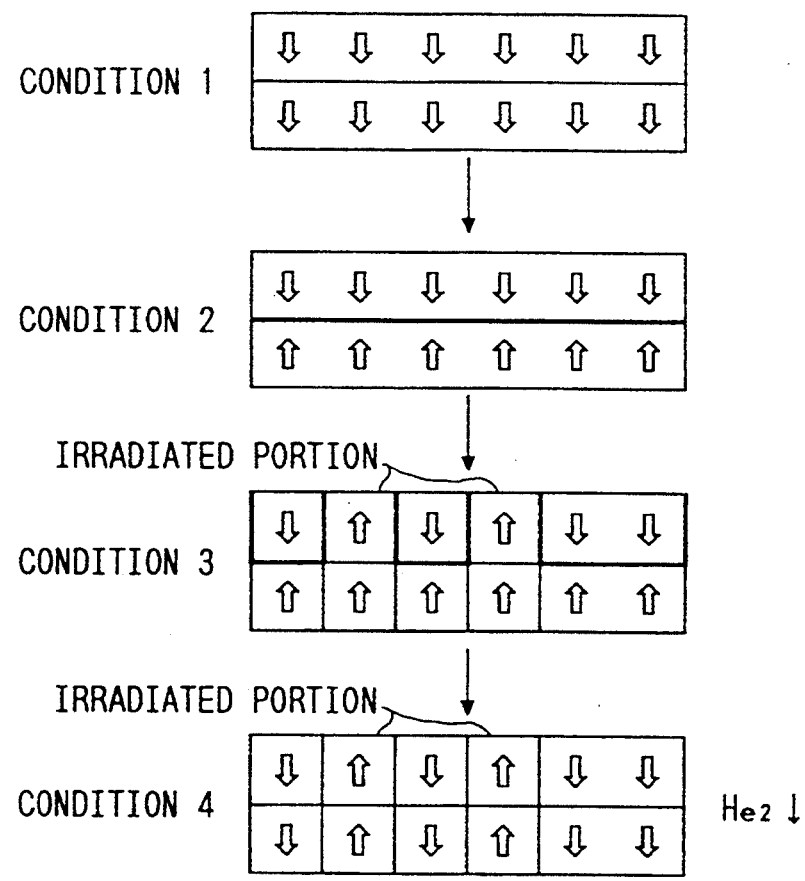
FIGS. 1A and 1B are diagrams showing changes in direction of magnetization in a magnetooptical recording method according to the first aspect of this invention.
Figure 1B:
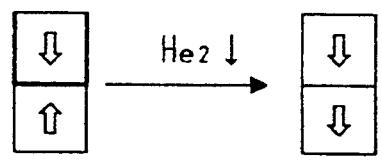
Figure 2A:
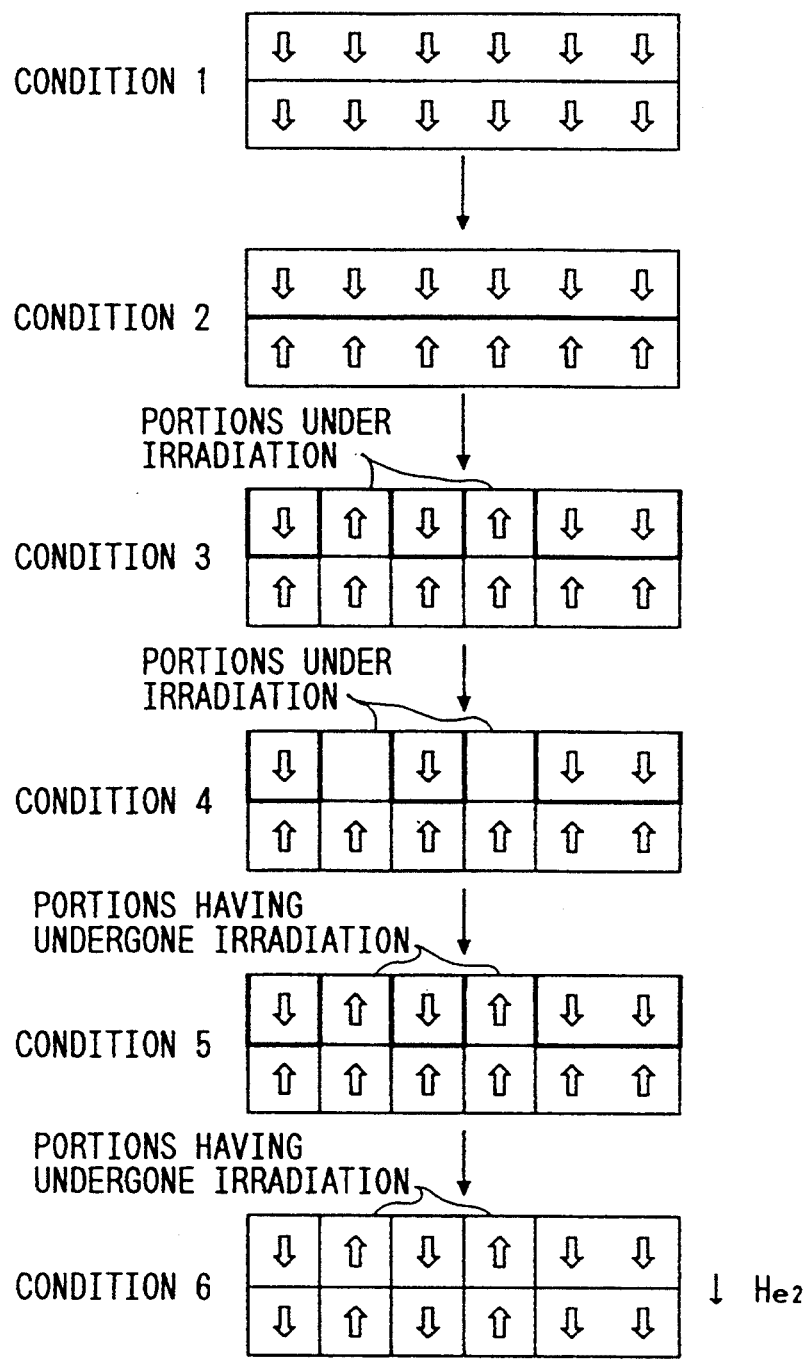
FIGS. 2A and 2B are diagrams showing changes in direction of magnetization in a magnetooptical recording method according to the second aspect of this invention.
Figure 2B:
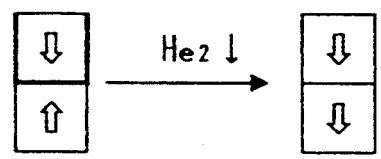
Figure 3:
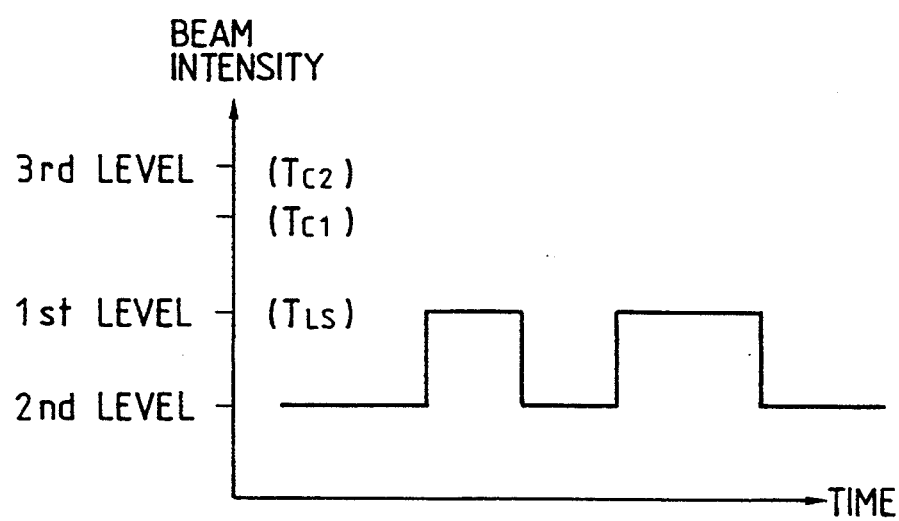
FIG. 3 is a graph showing beam intensity levels in the magnetooptical recording method according to the first aspect of this invention;.
Figure 4:
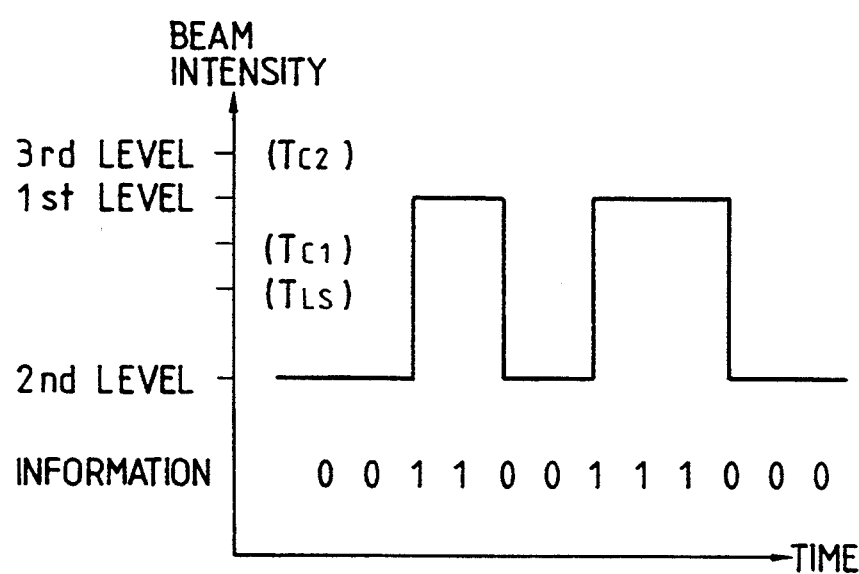
FIG. 4 is a graph showing beam intensity levels in the magnetooptical recording method according to the second aspect of this invention.
Figure 5:
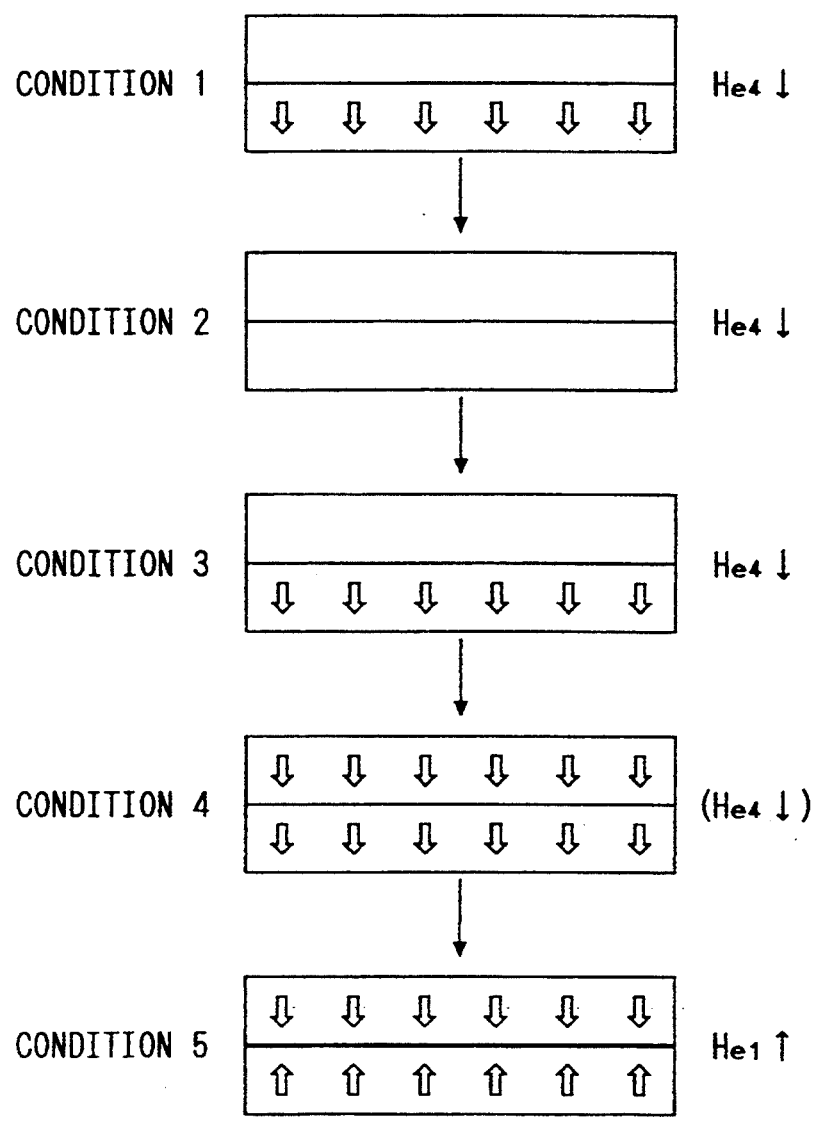
FIG. 5 is a diagram for explaining a preparation method of a medium in a state with a magnetic wall by the preparation method E.
Figure 6:
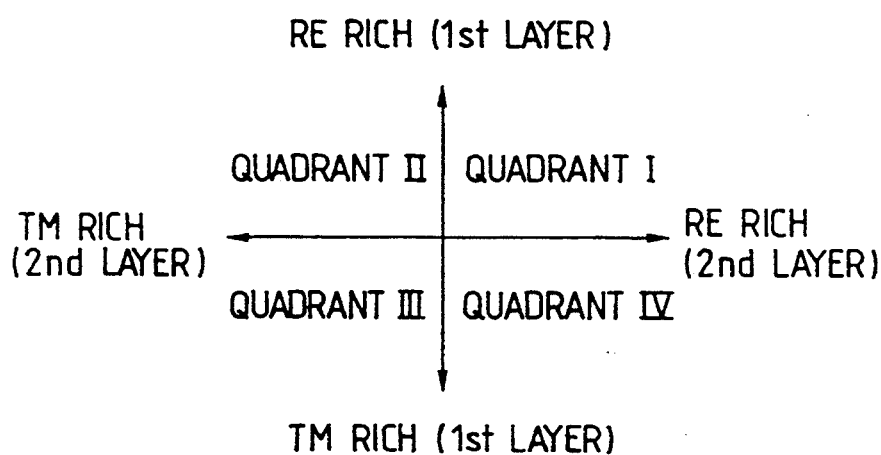
FIG. 6 is a map showing types of media classified into four quadrants.
Figure 7:
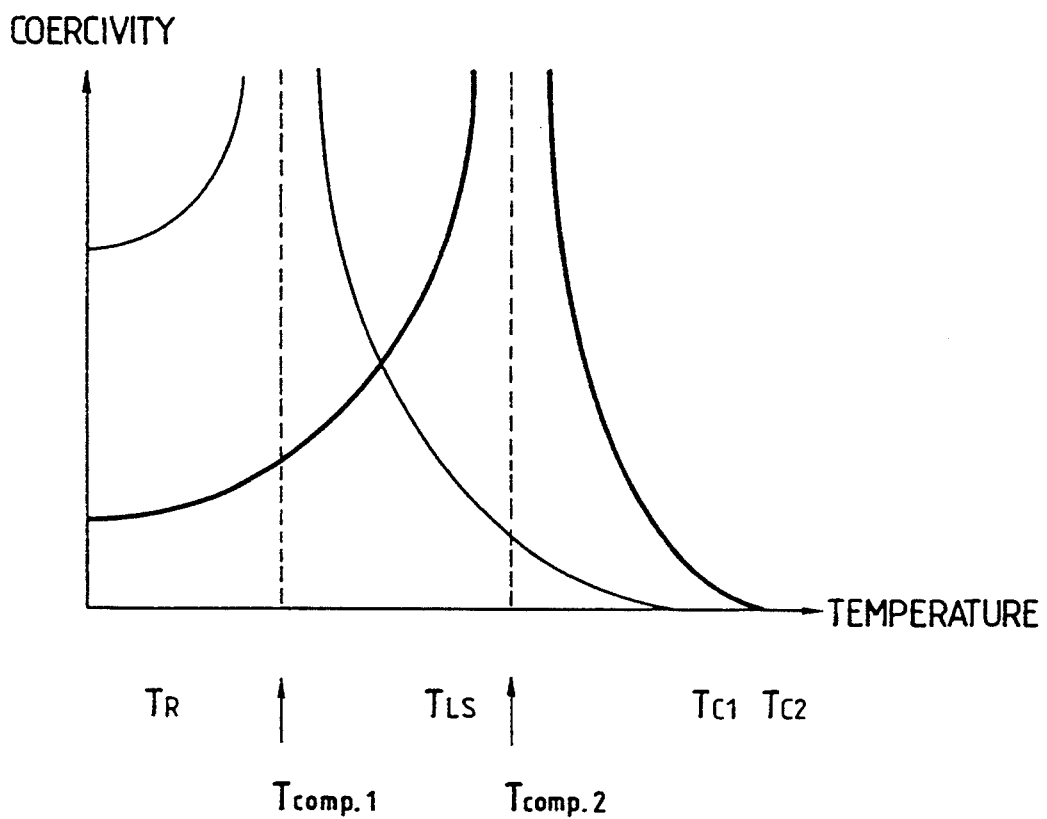
FIG. 7 is a graph showing the relationship between coercivities of the first and second layers and a temperature of a medium No. 1.
Figure 8:
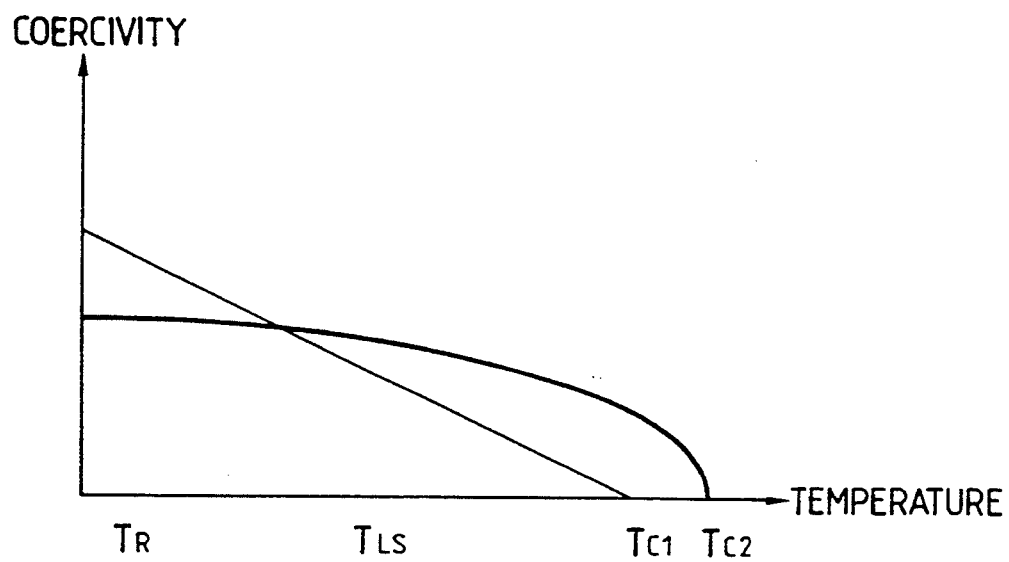
FIG. 8 is a graph showing the relationship between coercivities of the first and second layers and a temperature of a medium No. 4.
Figure 9:
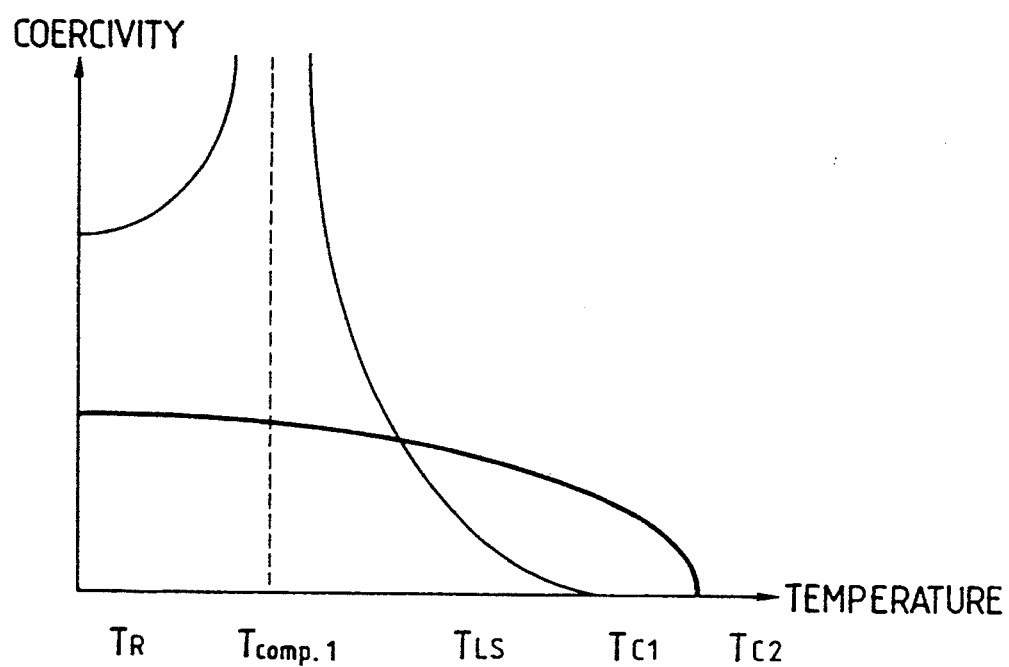
FIG. 9 is a graph showing the relationship between coercivities of the first and second layers and a temperature of a medium No. 5.
Figure 10:
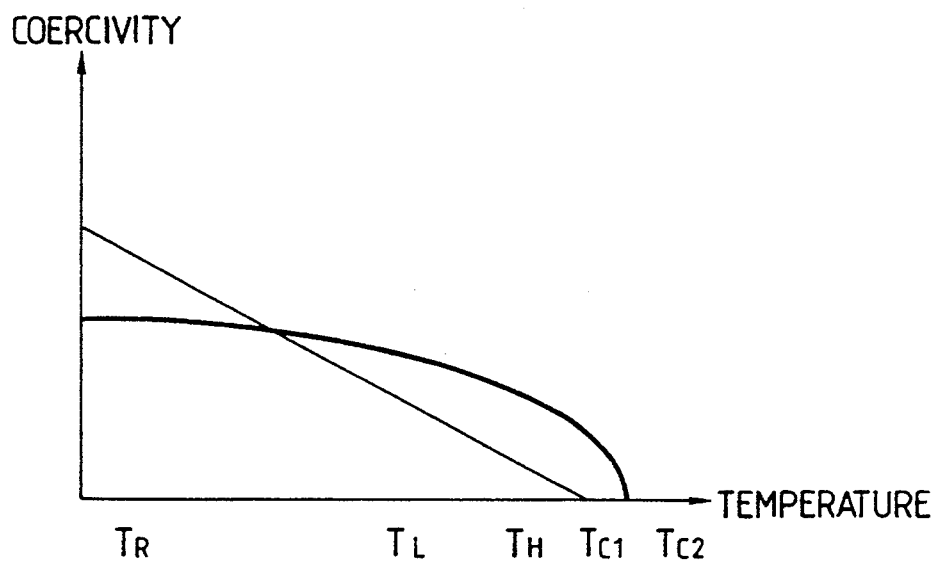
FIG. 10 is a graph showing the relationship between coercivities of the first and second layers and a temperature of a medium No. 7.
Figure 11:
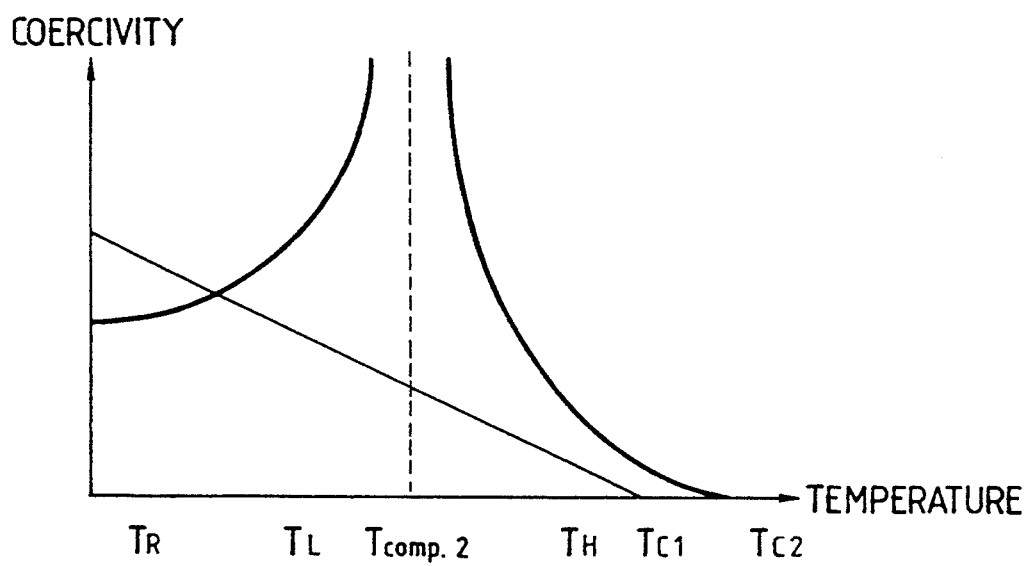
FIG. 11 is a graph showing the relationship between coercivities of the first and second layers and a temperature of a medium No. 8.
Figure 12:
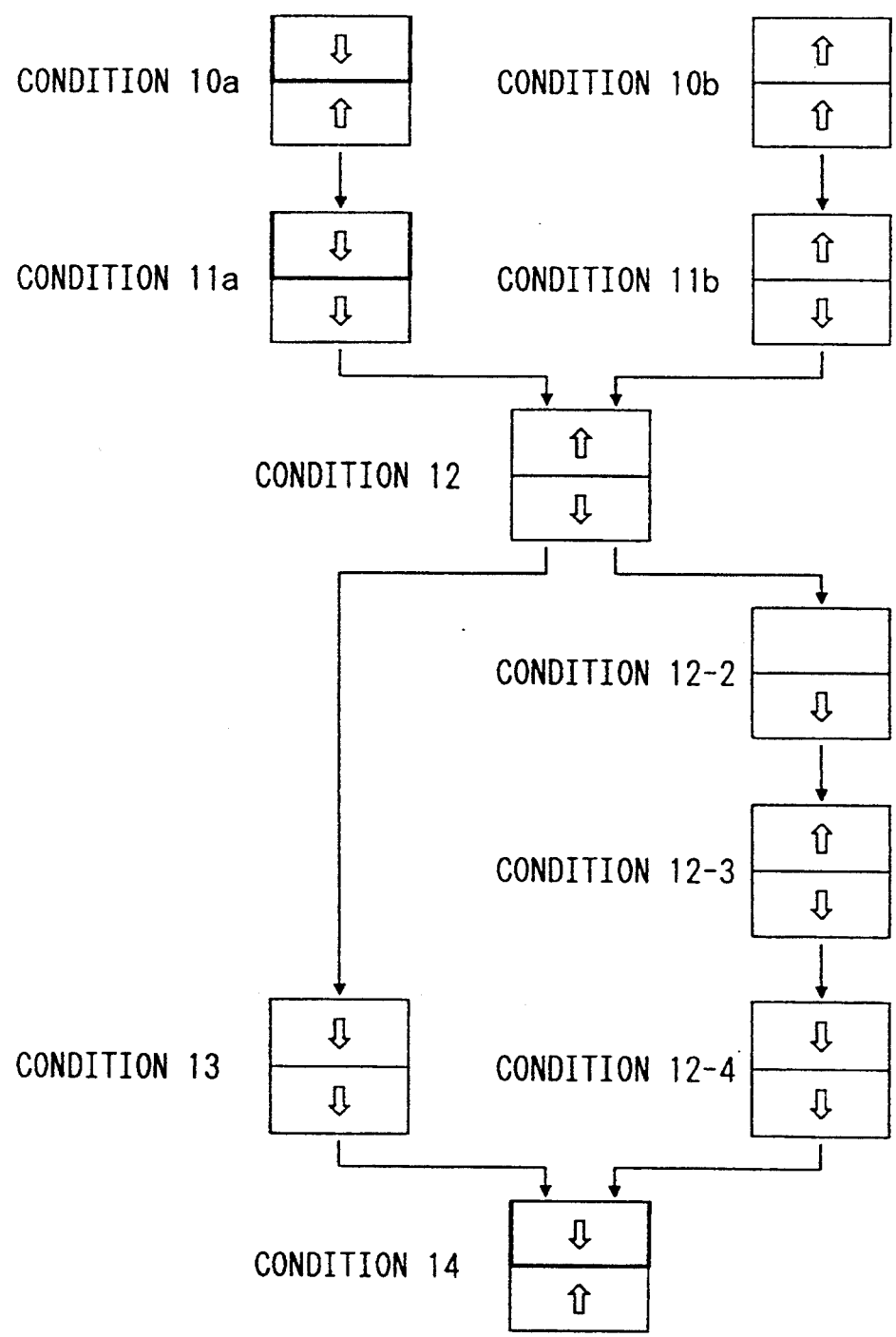
FIG. 12 is a diagram showing changes in direction of magnetization in step 1 of the medium No. 1 according to the first aspect of this invention.
Figure 13:
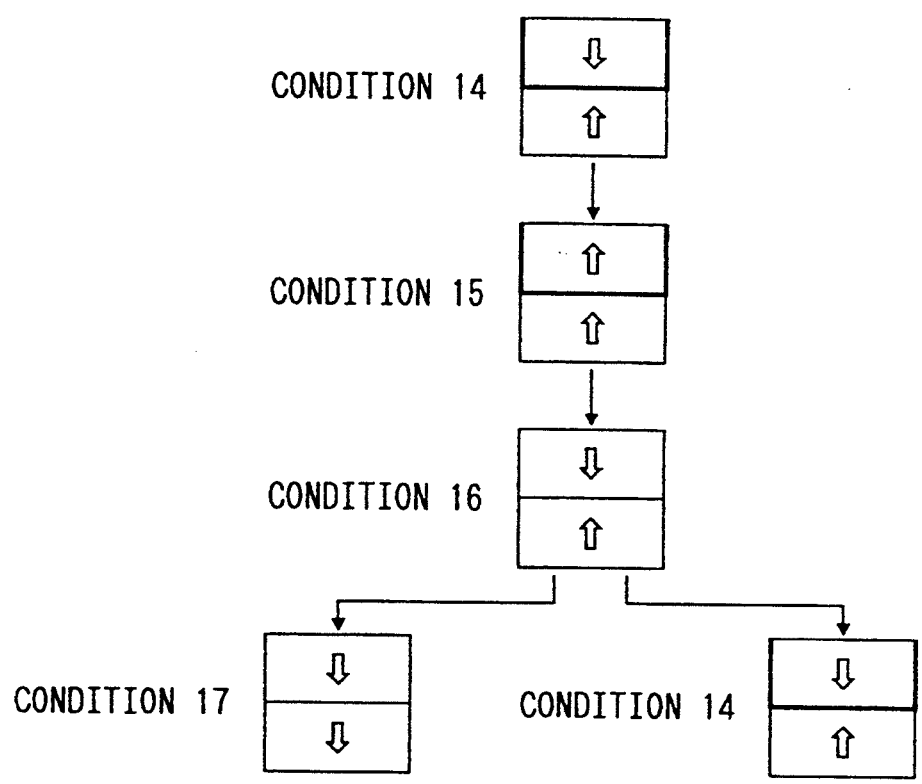
FIG. 13 is a diagram showing changes in direction of magnetization in step 2 of the medium No. 1 according to the first aspect of this invention.
Figure 14:
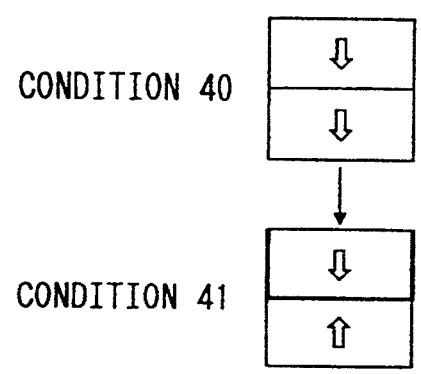
FIG. 14 is a diagram showing changes in direction of magnetization in step 1 of the medium No. 4 according to the first aspect of this invention.
Figure 15:
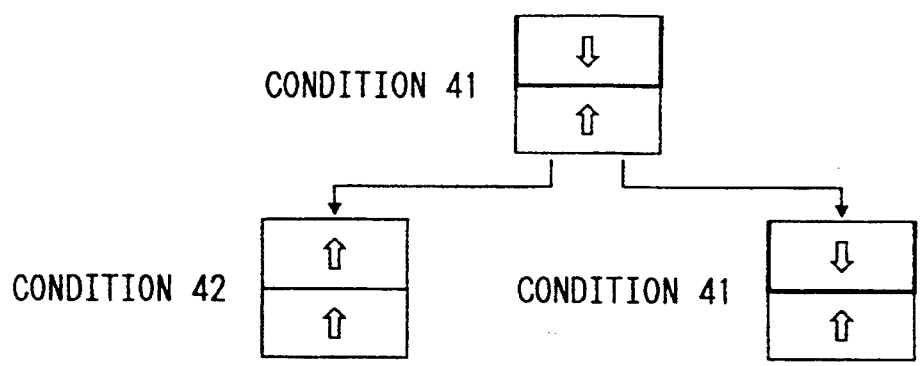
FIG. 15 is a diagram showing changes in direction of magnetization in step 2 of the medium No. 4 according to the first aspect of this invention.
Figure 16:
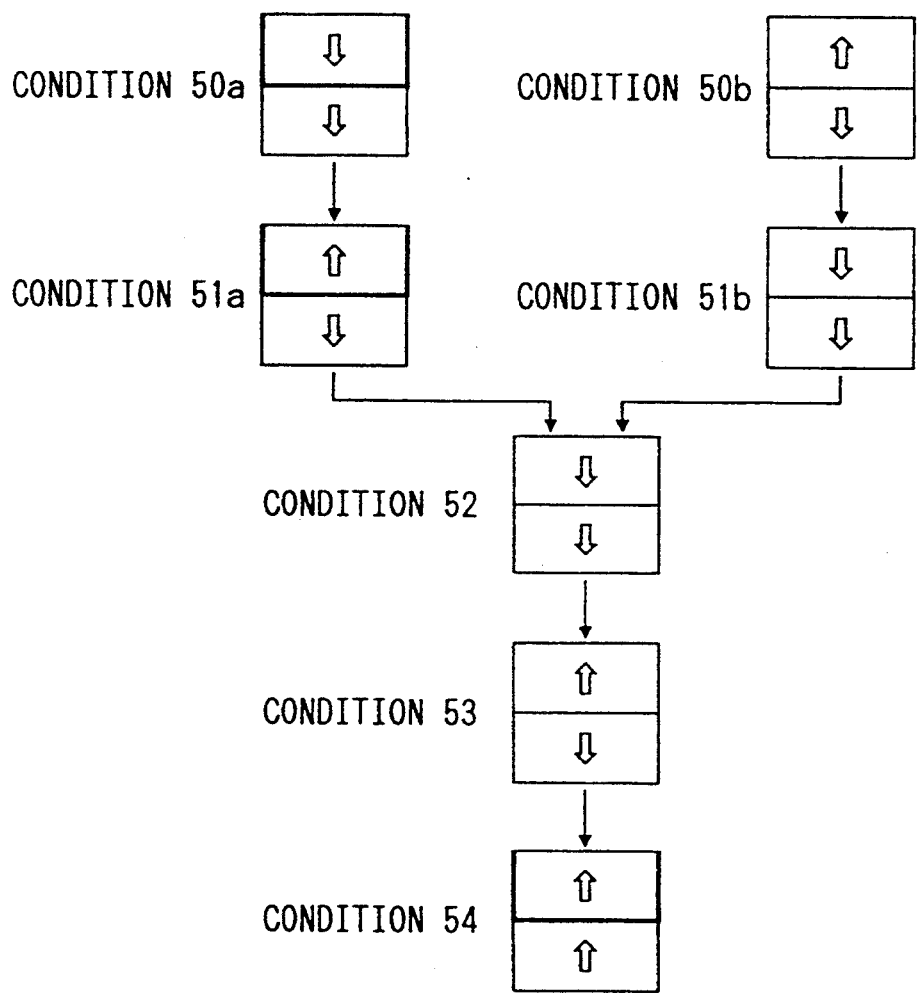
FIG. 16 is a diagram showing changes in direction of magnetization in step 1 (by the preparation method D) of the medium No. 5 according to the first aspect of this invention.
Figure 17:
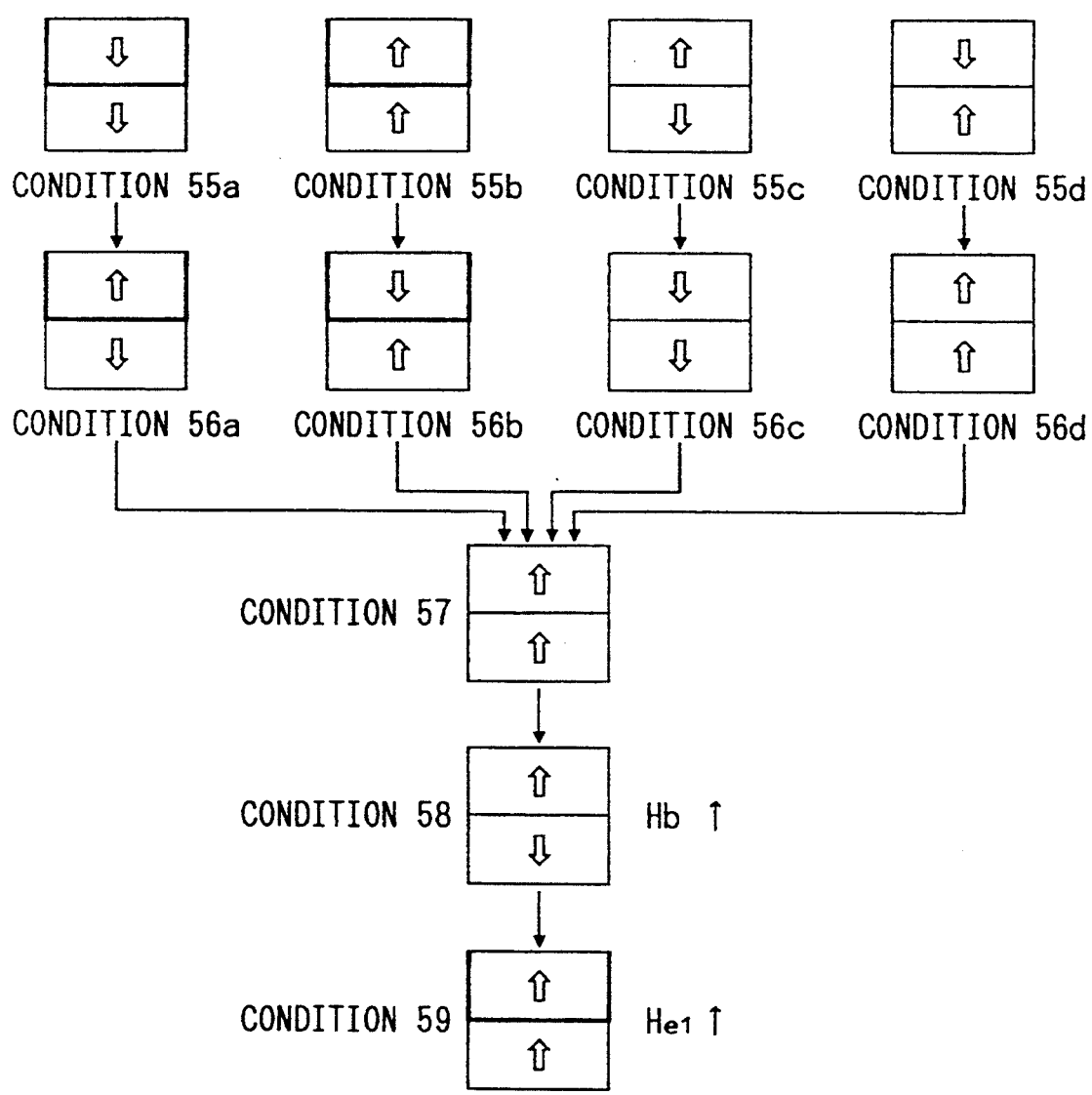
FIG. 17 is a diagram showing changes in direction of magnetization in step 1 (by the preparation method E) of the medium No. 5 according to the first aspect of this invention.
Figure 18:
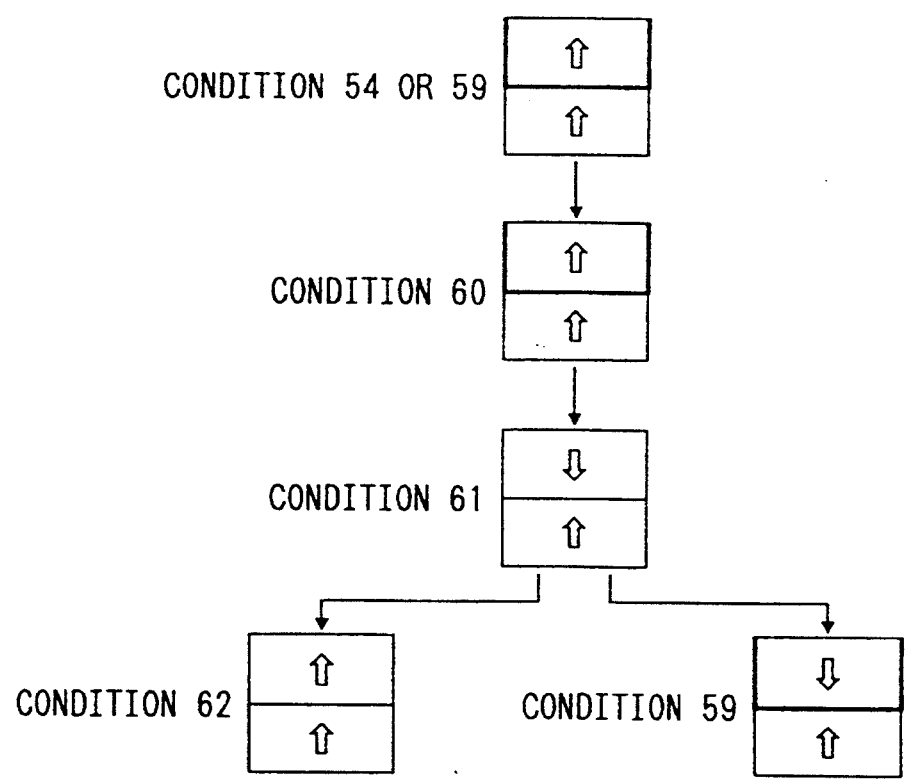
FIG. 18 is a diagram showing changes in direction of magnetization in step 2 of the medium No. 5 according to the first aspect of this invention.
Figure 19:
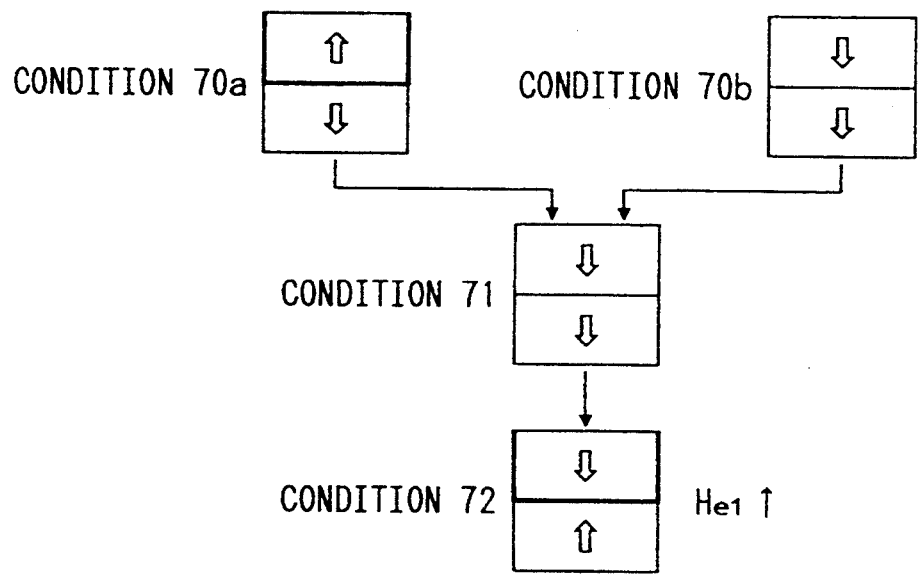
FIG. 19 is a diagram showing changes in direction of magnetization in step 1 of the medium No. 7 according to the first aspect of this invention.
Figure 20:
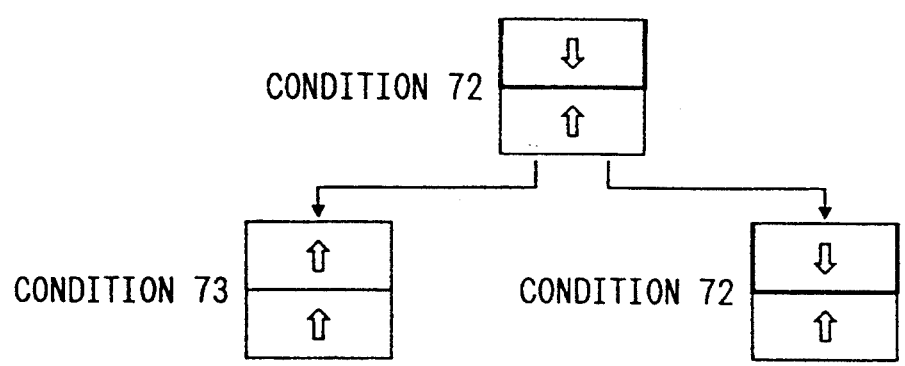
FIG. 20 is a diagram showing changes in direction of magnetization in step 2 of the medium No. 7 according to the first aspect of this invention.
Figure 21:
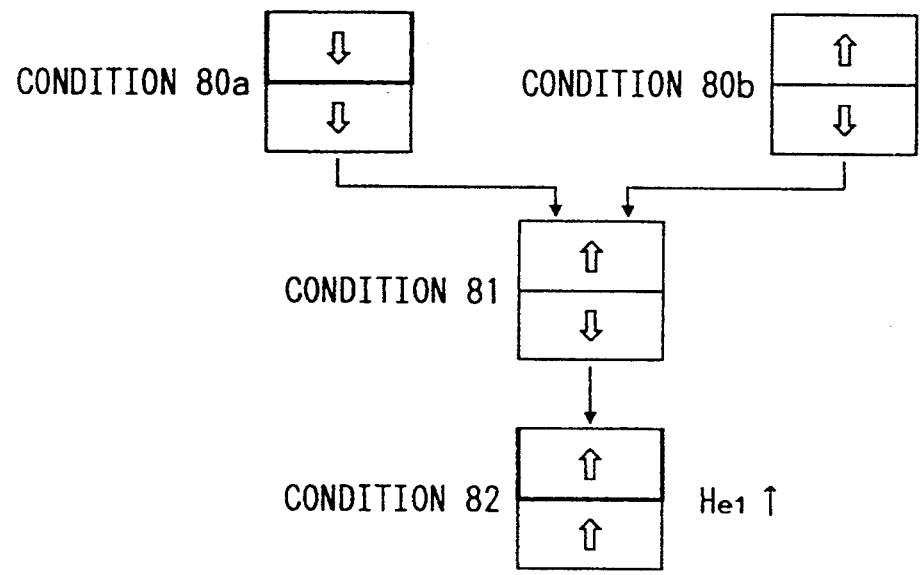
FIG. 21 is a diagram showing changes in direction of magnetization in step 1 of the medium No. 8 according to the first aspect of this invention.
Figure 22:
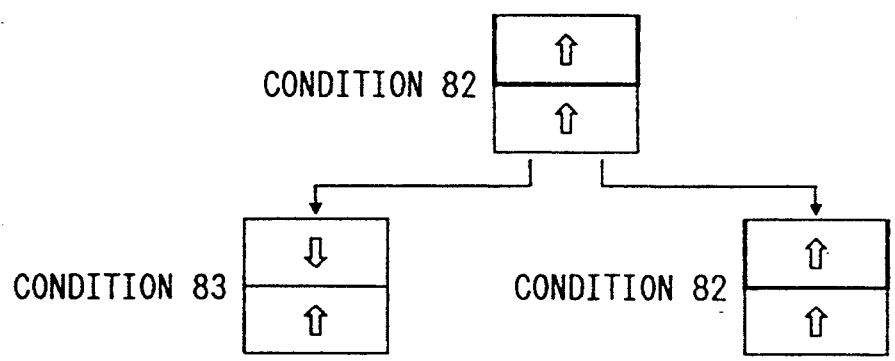
FIG. 22 is a diagram showing changes in direction of magnetization in step 2 of the medium No. 8 according to the first aspect of this invention.
Figure 23:
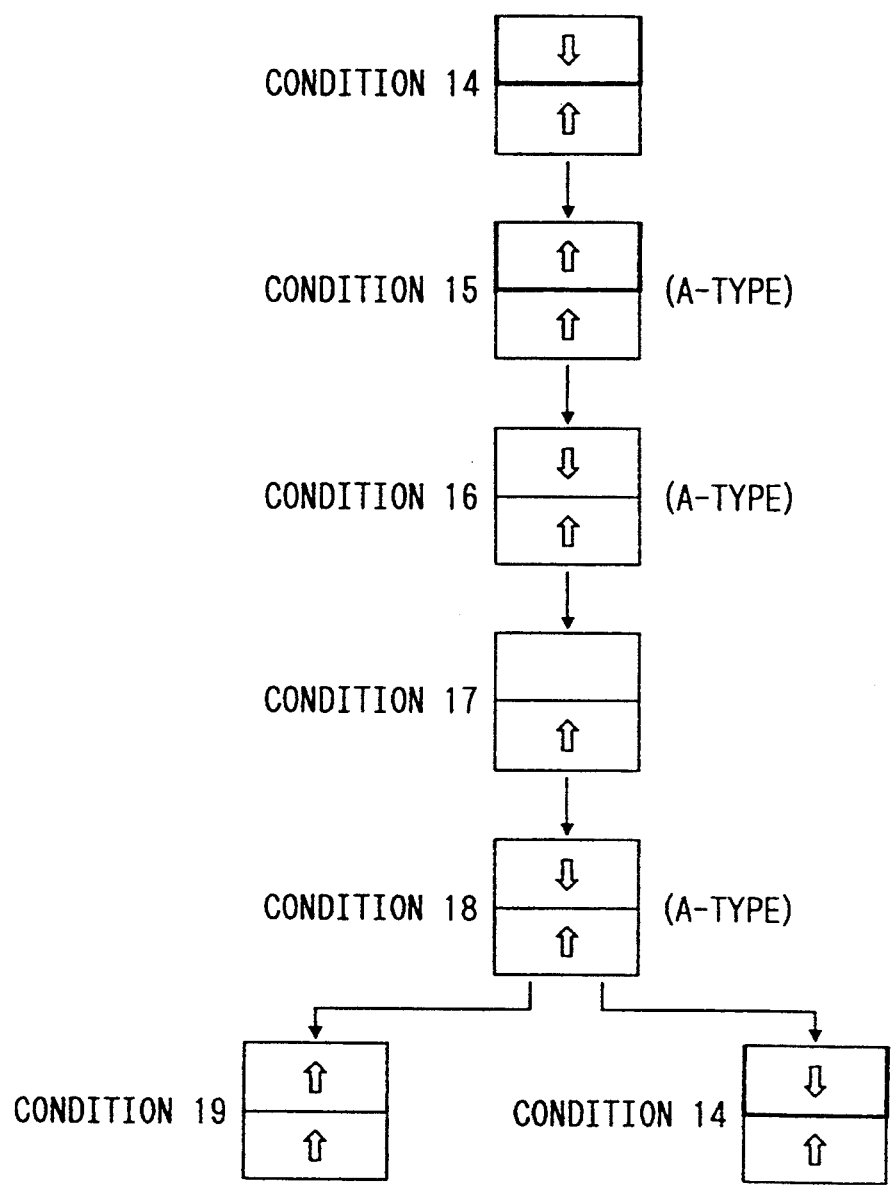
FIG. 23 is a diagram showing changes in direction of magnetization in step 2 of the medium No. 1 according to the second aspect of this invention.
Figure 24:
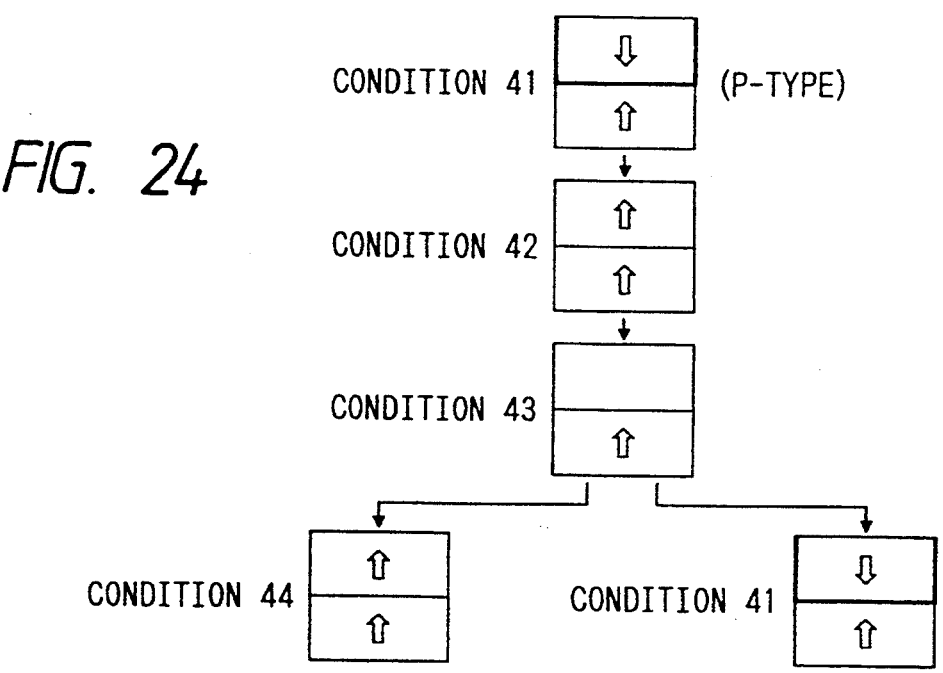
FIG. 24 is a diagram showing changes in direction of magnetization in step 2 of the medium No. 4 according to the second aspect of this invention.
Figure 25:
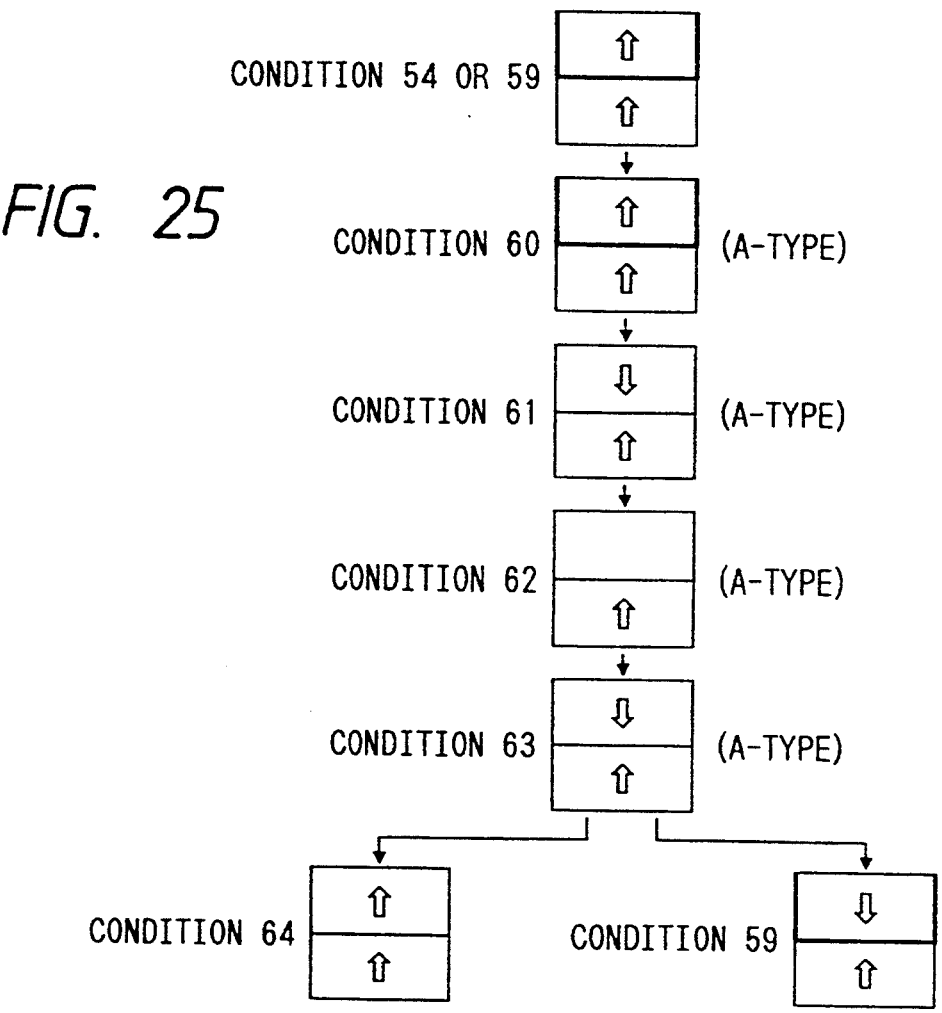
FIG. 25 is a diagram showing changes in direction of magnetization in step 2 of the medium No. 5 according to the second aspect of this invention.
Figure 26:
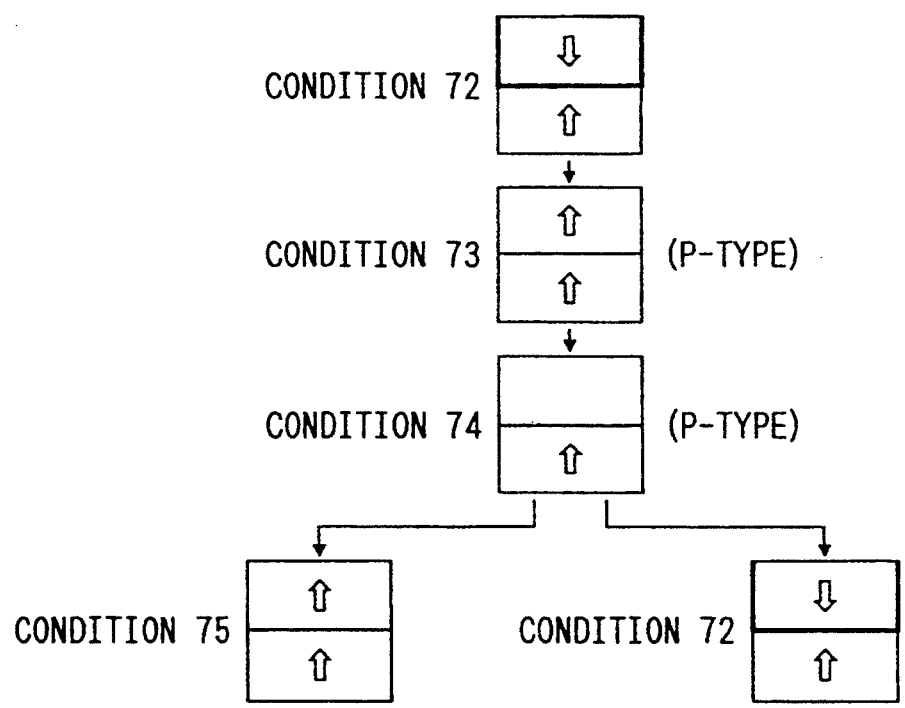
FIG. 26 is a diagram showing changes in direction of magnetization in step 2 of the medium No. 7 according to the second aspect of this invention.
Figure 27:
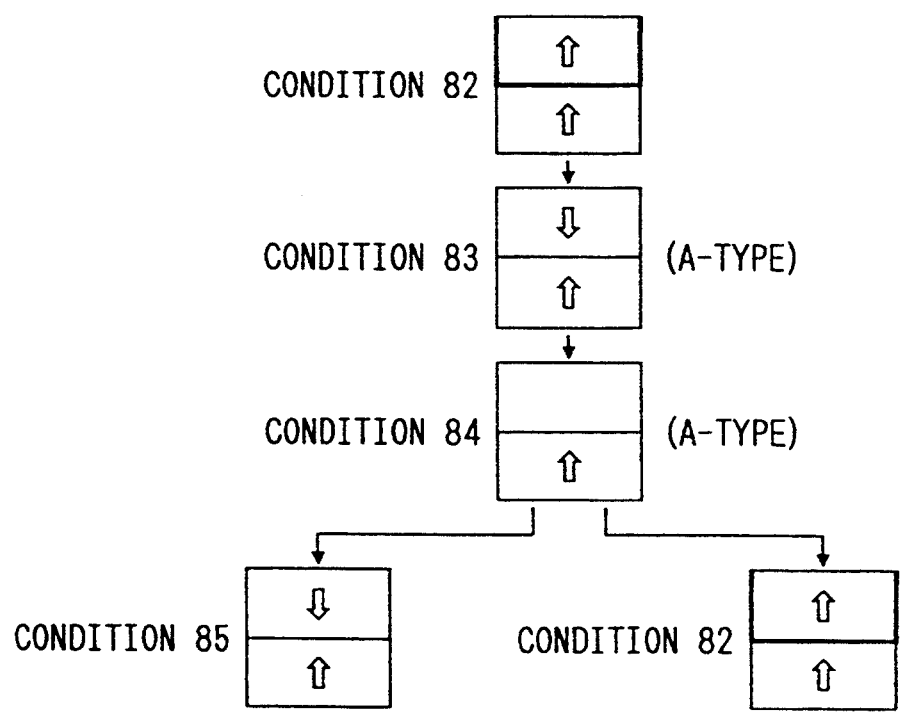
FIG. 27 is a diagram showing changes in direction of magnetization in step 2 of the medium No. 8 according to the second aspect of this invention.
Figure 28:
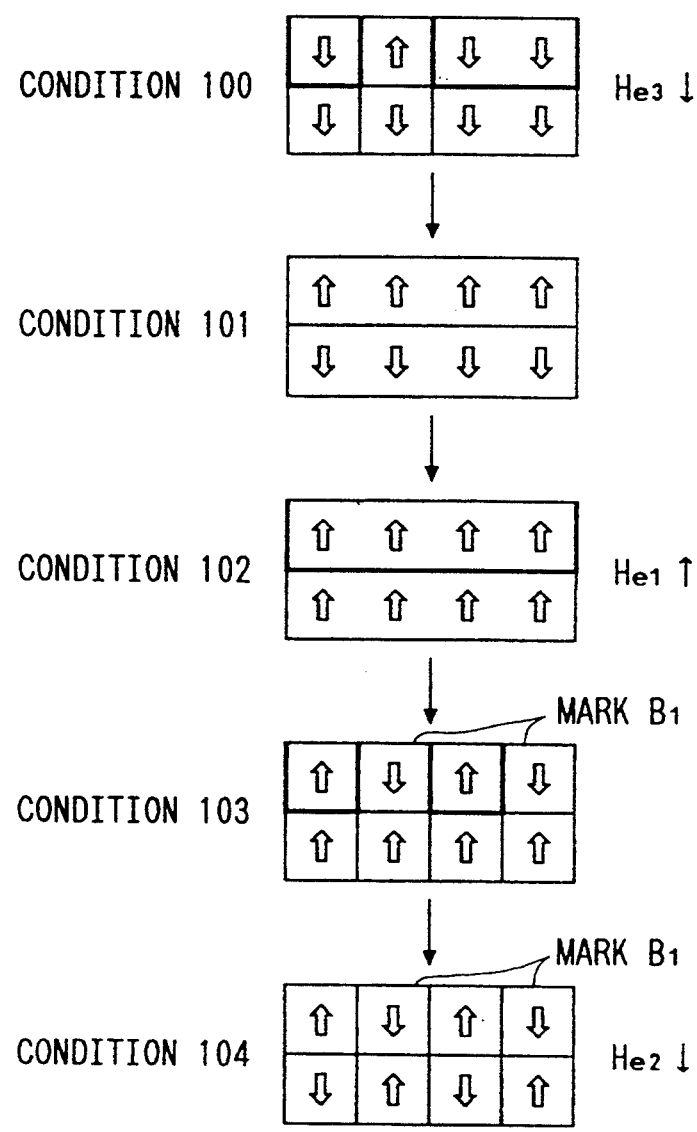
FIG. 28 is a diagram showing changes in direction of magnetization in an example according to the first aspect of the present invention.

The state of the medium which completes step 2 (i.e., subjected to recording) is represented by Condition 103 in FIG. 28.

The magnetic field applying means 1 of the apparatus shown in FIG. 30 was replaced with a second external field $H_{e2}$ (2,000 Oe) applying means for applying a magnetic field in the opposite direction ↓. The magnitude of $H_{e2}$ satisfies Formula 8 at the room temperature.

In this state, the medium (S) subjected to recording in step 2 was set in this apparatus, and was rotated at the same rotational speed.

As a result, the medium (S) passes below the replaced magnetic field applying means to receive $H_{e2}$ ↓. Thus, the direction of magnetization of only the second layer in a portion with an interface magnetic wall is reversed, and at the same time, the interface magnetic wall disappears. This state corresponds to Condition 104 in FIG. 28.

REFERENCE EXAMPLE 4

Reproduction

The apparatus used in step 2 in Example 2 was used. A laser beam emitted from the reproduction optical head 3 was radiated on the second layer while the medium (S) was rotated at the same rotational speed, and information was magnetooptically reproduced from light reflected by the second layer. The beam intensity was 4 mW (on the magnetic thin film surface).

As a result, the standard information (10 MHz) was reproduced, and a C/N ratio at that time was 60 dB. This value is higher by 6 dB than that in Reference Example 3.

REFERENCE EXAMPLE 5

Magnetooptical Recording/reproduction Apparatus

Figure 31:
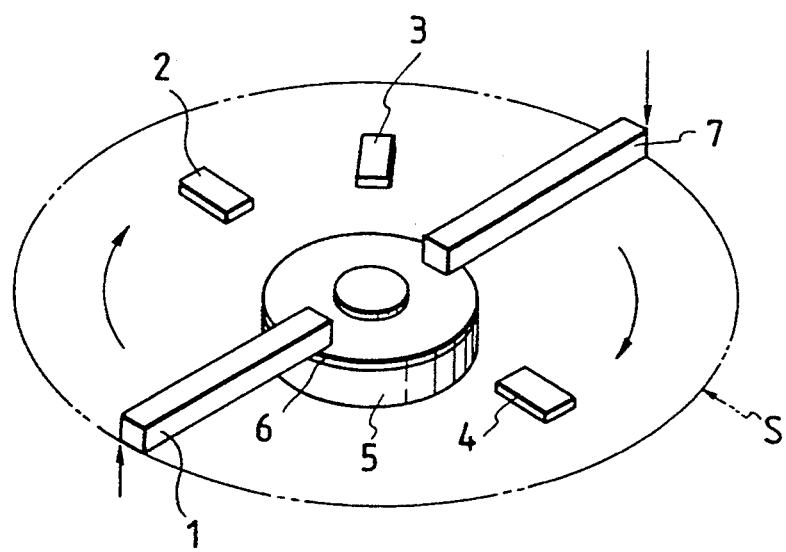
FIG. 31 is a schematic perspective view of a magnetooptical recording/reproduction apparatus of Reference Example 5.

FIG. 31 is a schematic perspective view of another magnetooptical recording/reproduction apparatus. In this apparatus, a third external field $H_{e3}$ applying means (electromagnet) 7 used common to a sound external field $H_{e2}$ applying means, and an optical head 4 are added to the apparatus of Reference Example 2. The means 7 serves as the third external field $H_{e3}$ applying means when the intensity is increased, and step 1 (preparation method D) is executed by the means 7 and the optical head 4. The means 7 serves as the second external field $H_{e2}$ applying means when the intensity is decreased, and with this means, step 3 can be executed. In this case, the optical head 4 may be used for reproduction, and the reproduction optical head 3 may be omitted.

A first external field $H_{e1}$ applying means (electromagnet) 1 applies a magnetic field in a direction opposite to that of the means 7. The remaining members 2 to 6 are the same members denoted by the same reference numerals in Reference Example 2.

More specifically, this apparatus can execute steps 1 to 3 under only the electrical control without mechanically moving the members.

EXAMPLE 3

Figure 32:
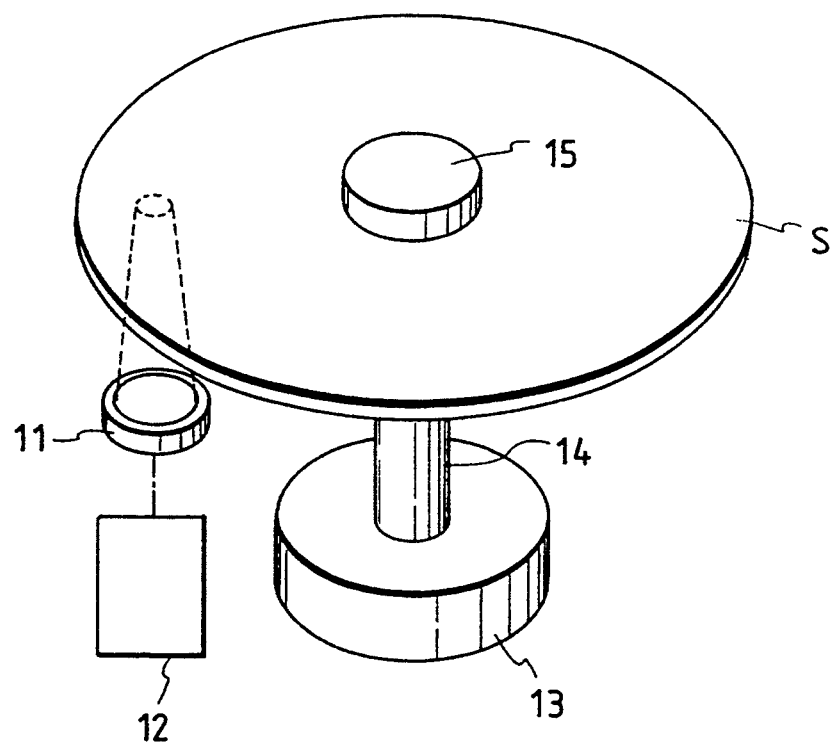
FIG. 32 is a schematic perspective view of a magnetooptical recording/reproduction apparatus of an example according to the third aspect of the present invention.

Magnetooptical Recording Apparatus According to the Third Aspect of This Invention FIG. 32 is a schematic perspective view of the apparatus of this example. This apparatus includes a first optical head 11 (a moving device is omitted), a modulation means 12, a spindle motor 13 for rotating a recording medium (S), a rotational shaft 14, and a spindle head 15 for chucking the recording medium (S).

EXAMPLE 4

Magnetooptical Recording According to the Second Aspect of This Invention

Step 1

In the apparatus of Example 3 (FIG. 32), a first external field applying means (magnet) for applying the third external field $H_{e3} = 6,000$ Oe on the surface of the magnetic thin film in the opposite direction ↓ was attached at an upstream position of the optical head 11.

The medium (S) manufactured in Reference Example 1 was chucked on the spindle head 15, and was rotated by the motor 13 at a speed of 4,800 rpm.

The moving device was set so that the optical head 11 tracked a position corresponding to a radius r = 30

The medium (S) passes below the magnet to receive the magnetic field, ($H_{e3} = 6,000$ Oe), and the direction of magnetization of only the second layer is aligned in the opposite direction ↓. This state is maintained after the influence of $H_{e3}$ disappears. The direction of magnetization of the first layer is unknown now since it is left unchanged. However, since the direction of magnetization is one of the predetermined direction ⇑ and the opposite direction ⇓, the present state is as shown in Condition 100 in FIG. 29. Since the medium No. 9 is of A type, an interface magnetic wall is formed in a portion where the directions of magnetization of the first and second layers are parallel to each other.

Then, a beam emitted from the optical head 11 was radiated on the medium (S) at an intensity of the third intensity level = 10 mW (on the magnetic thin film surface) without being modulated. Thus, the medium temperature is increased to 140° C., and Formulas 6 and 7 are satisfied. Values in these formulas are in units of Oe.

$$H_{C1} = 1,000 < \frac{\sigma_w}{2M_{S1}t_1} = 1,200 \qquad \text{Formula 6}$$

$$H_{C2} = 14,000 > \frac{\sigma_w}{2M_{S2}t_2} = 10,000 \qquad \text{Formula 7}$$

As a result, the direction of magnetization of the first layer in the portion with the interface magnetic wall is reversed to a stable direction (in this case, an antiparallel direction) with respect to the direction of magnetization of the second layer, and at the same time, the magnetic wall disappears. The direction of magnetization of the first layer in a portion without an interface magnetic wall is left unchanged since it is originally a stable direction (antiparallel direction) with respect to the direction of magnetization of the second layer. Therefore, the present state is as shown in Condition 101 in FIG. 29.

The driving operation of the apparatus was stopped, and the direction of the attached magnet was reversed. The driving operation of the apparatus was then restarted. The medium (S) passes below the magnet to receive the magnetic field ($H_{e1} = 6,000$ Oe) in the predetermined direction ↑, and the direction of magnetization of only the second layer is aligned in the predetermined direction. This state is maintained after the influence of $H_{e1}$ disappears. Therefore, the direction of magnetization of the medium (S) is as shown in Condition 102 in FIG. 29.

In this manner, step 1 was completed.

Step 2

A laser beam emitted from the optical head 11 was radiated onto the medium (S) which completed step 1, and was rotated at a speed of 4,800 rpm. In this case, the beam intensity was pulse-modulated by the modulation means 12 in accordance with standard information (10 MHz). The beam intensity was set to have the first intensity level = 18 mW (on the magnetic thin film surface) in the high level mode, and to have the second intensity level = 1 mW (on the magnetic thin film surface) in the low level mode. In the high level mode, the medium temperature is increased up to 250° C., and in the low level mode, the medium temperature is increased up to 40° C. In the low level mode, the beam was turned on at 1 mW as a tracking or focusing beam although it can have zero intensity.

As a result, an interface magnetic wall disappears in a portion irradiated with the beam at the first intensity level, and at the same time, the direction of magnetization of the first layer is reversed to the opposite direction ↑. Thus, marks $B_1$ (length=0.75 μm) having magnetization in the opposite direction ↑ were formed at 0.75-μm intervals. This state corresponds to Condition 103 in FIG. 29.

REFERENCE EXAMPLE 6

Reproduction

A versatile magnetooptical recording/reproduction apparatus is used. The reproduction optical head was adjusted to track a position corresponding to a radius r=30 mm. The medium (S) subjected to recording in Example 4 was set in this apparatus, and was rotated at a speed of 4,800 rpm. A laser beam emitted from the reproduction optical head 11 was radiated onto the first layer, and information was magnetooptically reproduced from light reflected by the first layer. The beam intensity was set to be 1 mW (on the magnetic thin film surface).

As a result, the standard information (10 MHz) was reproduced, and a C/N ratio at that time was 54 dB.

EXAMPLE 5

Modification of Magnetooptical Recording According to the Second Aspect of This Invention

Step 1

Same as Example 4.

Step 2

Same as Example 4.

Step 3

Figure 29:
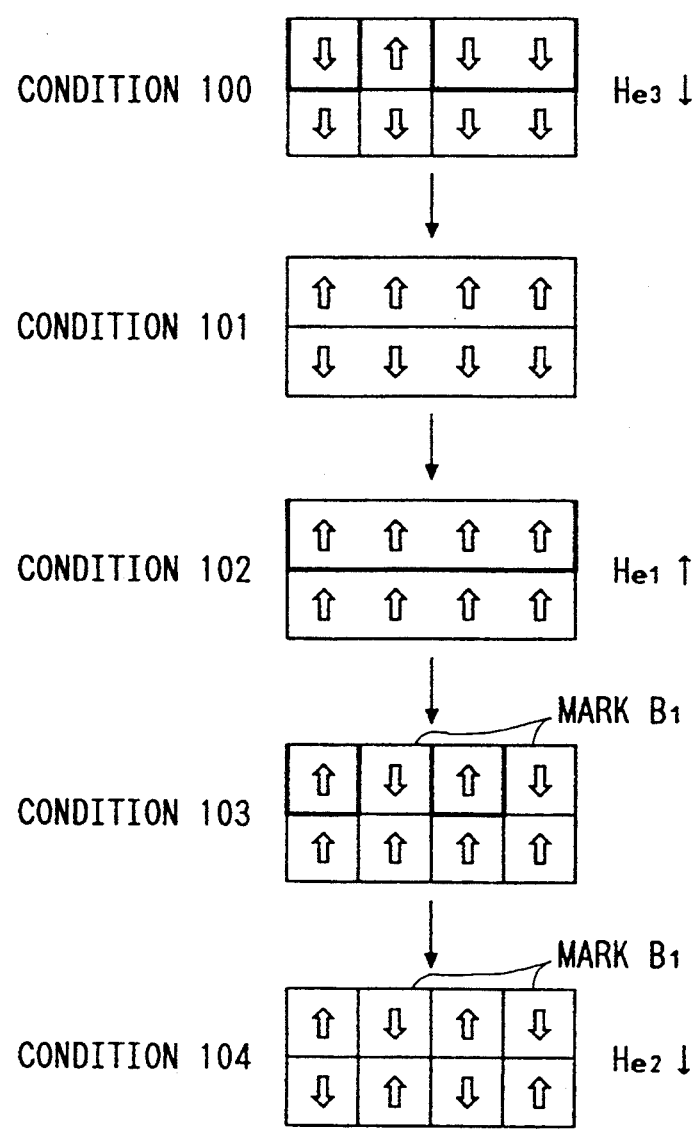
FIG. 29 is a diagram showing changes in direction of magnetization in an example according to the second aspect of the present invention.

The state of the medium which completes step 2 (i.e., subjected to recording) is represented by Condition 103 in FIG. 29.

A magnet was attached to the apparatus shown in FIG. 32 as a second external field ($H_{e2}$=2,000 Oe) applying means for applying a magnetic field in the opposite direction ↓. The magnitude of $H_{e2}$ satisfies Formula 8 at the room temperature.

Thereafter, the medium (S) subjected to recording in step 2 was set in this apparatus, and was rotated at the same rotational speed.

As a result, the medium (S) passes below the magnet to receive $H_{e2}$ ↓. Thus, the direction of magnetization of only the second layer in a portion with a magnetic wall is reversed, and at the same time, the interface magnetic wall disappears. This state corresponds to Condition 104 in FIG. 29.

REFERENCE EXAMPLE 7

Reproduction

The apparatus used in Reference Example 6 was used. A laser beam emitted from the reproduction optical head was radiated onto the second layer while the medium (S) was rotated at the same rotational speed, and information was magnetooptically reproduced from light reflected by the second layer. The beam intensity was 4 mW (on the magnetic thin film surface).

As a result, the standard information (10 MHz) was reproduced, and a C/N ratio at that time was 60 dB.

This value is higher by 6 dB than that in Reference Example 6.

EXAMPLE 6

Figure 33:
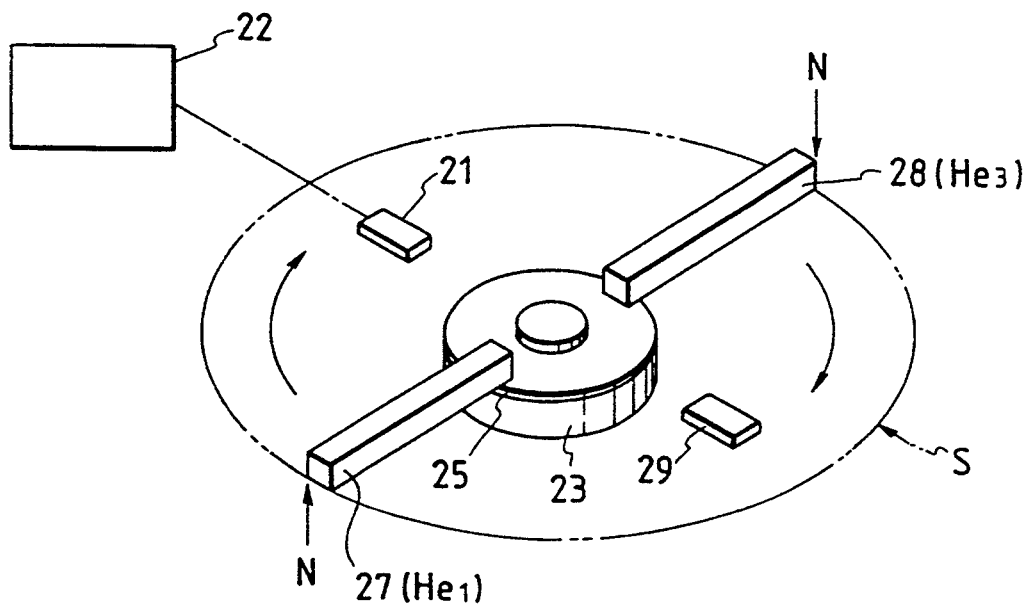
FIG. 33 is a schematic perspective view of a magnetooptical recording/reproduction apparatus of another example according to the third aspect of the present invention.

Magnetooptical Recording Apparatus According to the Fourth Aspect of This invention FIG. 33 is a schematic perspective view of another magnetooptical recording apparatus. This apparatus includes a first optical head 21, a modulation means 22, a spindle motor 23 for rotating a recording medium (S), a spindle head 25 for chucking the recording medium (S), a first external field $H_{e1}$ applying means (electromagnet) 27, a third external field $H_{e3}$ applying means (electromagnet) 28, and a second optical head 29.

The first half of step 1 (preparation method D) is executed by the third external field $H_{e3}$ applying means 28 and the optical head 29. At this time, the $H_{e1}$ applying means 27 is kept OFF. In the second half, the $H_{e1}$ applying means 27 is turned on, and the $H_{e3}$ applying means is kept OFF.

Upon completion of step 1, both the means 27 and 28 are turned off, and the first optical head 21 is turned on in step 2. A laser beam emitted from the first optical head 21 is radiated on the medium (S) while being modulated according to information by the modulation means 22, thereby recording information.

After the second half of step 1 is executed, step 2 may be subsequently executed before one revolution of the medium (S).

EXAMPLE 7

Modification of Magnetooptical Recording Apparatus According to the Fourth Aspect of This Invention In this apparatus, a second external field $H_{e2}$ applying means (electromagnet) used common to the third external field $H_{e3}$ applying means 28 is arranged in the apparatus of Example 6 (FIG. 33). When the intensity of a current to be supplied to this means is changed, the means 28 can selectively generate $H_{e3}$ or $H_{e2}$, and can apply the generated field to the medium (S).

Therefore, upon completion of recording, the means 27 is turned off, and the medium (S) passes below the means 28. As a result, an interface magnetic wall between the two layers which is left in a mark $B_0$ after recording disappears. Thus, when the second optical head is used common to a reproduction head, information can be reproduced from the second layer.

What is claimed is:

1. A non-overwritable magnetooptical recording apparatus comprising:
   (a) a magnetooptical recording medium including at least first and second exchange-coupled layers having perpendicular magnetic anisotrophy, the second layer having a Curie temperature higher than a Curie temperature of the first layer, a direction of magnetization of the second layer being capable of being aligned in a predetermined direction by an external magnetic field at a room temperature without changing a direction of magnetization of the first layer, the magnetization of the second layer being aligned in said predetermined direction and the magnetization of the first layer being aligned in a direction such that an interface magnetic wall is present between the first and second layers in at least each recording portion of the medium;
   (b) means for rotating said medium;

(c) an optical head which radiates a light beam to said medium; and (d) modulation means which pulse-modulates intensity of the light beam from said optical head, in accordance with binary information to be recorded, between a first intensity level which imparts to a recording portion a temperature at least as high as the Curie temperature of said first layer and lower than the Curie temperature of said second layer and which thereby forms a mark having no interface magnetic wall between said first and second layers, and a second intensity level, including zero-level, which imparts to a recording portion a temperature lower than a lowest temperature at which said interface magnetic wall disappears, whereby said mark is not formed.

2. An apparatus according to claim 1, further comprising:

external field applying means which generates a magnetic field in a direction opposite to said predetermined direction and which causes disappearance of any interface magnetic wall present between said first and second layers at a region between said mark and a neighboring such mark.

3. A non-overwritable magnetooptical recording apparatus comprising:

(a) a magnetooptical recording medium including at least first and second exchange-coupled layers having perpendicular magnetic anisotrophy, the second layer having a Curie temperature higher than a Curie temperature of the first layer, a direction of magnetization of said second layer being capable of being aligned in a predetermined direction by an external magnetic field at a room temperature without changing a direction of magnetization of said first layer;

(b) means for rotating said medium;

(c) external magnetic field applying means which, in at least each recording portion of said medium, aligns the direction of magnetization of said second layer in a direction opposite to the predetermined direction at the room temperature without changing the direction of magnetization of said first layer;

(d) an optical head which radiates to said medium a non-modulated laser beam at a predetermined intensity level that imparts to each recording portion a temperature at least as high as the Curie temperature of said first layer and lower than the Curie temperature of said second layer and which causes disappearance of an interface magnetic wall which may be present between said first and second layers;

(e) external magnetic field applying means which, in at least each recording portion of said medium, aligns the direction of magnetization of said second layer in the predetermined direction at the room temperature without changing the direction of magnetization of said first layer and which forms an interface magnetic wall between said first and second layers in at least each recording portion;

(f) another optical head which radiates a light beam to said medium; and (g) modulation means which pulse-modulates intensity of the light beam radiated from said another optical head, in accordance with binary information to be recorded, between a first intensity level which imparts to a recording portion a temperature at least as high as the Curie temperature of said first layer and lower than the Curie temperature of said second layer and which thereby forms a mark having no interface magnetic wall between said first and second layers, and a second intensity level, including zero-level, which imparts to a recording portion a temperature lower than a lowest temperature at which said interface magnetic wall between said first and second layers disappears, whereby said mark is not formed.

4. An apparatus according to claim 3, further comprising:

external field applying means which generates a magnetic field in a direction opposite to said predetermined direction and which causes disappearance of any interface magnetic wall present between said first and second layers at a region between said mark and a neighboring such mark.

5. A non-overwritable magnetooptical recording apparatus comprising:

(a) a magnetooptical recording medium including at least first and second exchange-coupled layers having perpendicular magnetic anisotrophy, the second layer having a Curie temperature higher than a Curie temperature of the first layer, a direction of magnetization of the second layer being capable of being aligned in a predetermined direction by an external magnetic field at a room temperature without changing a direction of magnetization of the first layer, the magnetization of the second layer being aligned in said predetermined direction and the magnetization of the first layer being aligned in a direction such that an interface magnetic wall is present between the first and second layers in at least each recording portion of the medium;

(b) means for rotating said medium;

(c) an optical head which radiates a light beam to said medium; and (d) modulation means which pulse-modulates intensity of the light beam from said optical head, in accordance with binary information to be recorded, between a first intensity level which imparts to a recording portion a temperature lower than the Curie temperature of said first layer and at least as high as a lowest temperature at which an interface magnetic wall between said first and second layers disappears and which thereby forms a mark having no interface magnetic wall between said first and second layers, and a second intensity level, including zero-level, which imparts to a recording portion a temperature lower than said lowest temperature at which said interface magnetic wall disappears, whereby said mark is not formed.

6. An apparatus according to claim 5, further comprising:

external field applying means which generates a magnetic field in a direction opposite to said predetermined direction and which causes disappearance of any interface magnetic wall present between said first and second layers at a region between said mark and a neighboring such mark.

7. A non-overwritable magnetooptical recording apparatus comprising:

(a) a magnetooptical recording medium including at least first and second exchange-coupled layers having perpendicular magnetic anisotrophy, the second layer having a Curie temperature higher than a Curie temperature of the first layer, a direction of magnetization of said second layer being capable of being aligned in a predetermined direction by an external magnetic field at a room temperature without changing a direction of magnetization of said first layer;

(b) means for rotating said medium;

(c) external magnetic field applying means which, in at least each recording portion of said medium, aligns the direction of magnetization of said second layer in a direction opposite to the predetermined direction at the room temperature without changing the direction of magnetization of said first layer;

(d) an optical head which radiates to said medium a non-modulated laser beam at a predetermined intensity level that imparts to each recording portion a temperature at least as high as the Curie temperature of said first layer and lower than the Curie temperature of said second layer and which causes disappearance of an interface magnetic wall which may be present between said first and second layers;

(e) external magnetic field applying means which, in at least each recording portion of said medium, aligns the direction of magnetization of said second layer in the predetermined direction at the room temperature without changing the direction of magnetization of said first layer and which forms an interface magnetic wall between said first and second layers in at least each recording portion;

(f) another optical head which radiates a light beam to said medium; and (g) modulation means which pulse-modulates intensity of the light beam radiated from said another optical head, in accordance with binary information to be recorded, between a first intensity level which imparts to a recording portion a temperature lower than the Curie temperature of said first layer and at least as high as a lowest temperature at which an interface magnetic wall between the first and second layers disappears and which thereby forms a mark having no interface magnetic wall between said first and second layers, and a second intensity level, including zero-level, which imparts to a recording portion a temperature lower than said lowest temperature at which said interface magnetic wall disappears, whereby said mark is not formed.

8. An apparatus according to claim 7, further comprising:

external field applying means which generates a magnetic field in a direction opposite to said predetermined direction and which causes disappearance of any interface magnetic wall present between said first and second layers at a region between said mark and a neighboring such mark.

9. A non-overwritable magnetooptical recording apparatus comprising:

(a) a magnetooptical recording medium including at least first and second exchange-coupled layers having perpendicular magnetic anisotrophy, the second layer having a Curie temperature higher than a Curie temperature of the first layer, a direction of magnetization of said second layer being capable of being aligned in a predetermined direction by an external magnetic field at a room temperature without changing a direction of magnetization of said first layer;

(b) means for rotating said medium;

(c) external magnetic field applying means which, in at least each recording portion of said medium, aligns the direction of magnetization of said second layer in a direction opposite to the predetermined direction at the room temperature without changing the direction of magnetization of said first layer;

(d) means which radiates to said medium a non-modulated laser beam at a predetermined intensity level that imparts to each recording portion a temperature at least as high as the Curie temperature of said first layer and lower than the Curie temperature of said second layer and which causes disappearance of an interface magnetic wall which may be present between said first and second layers;

(e) external magnetic field applying means which, in at least each recording portion of said medium, aligns the direction of magnetization of said second layer in the predetermined direction at the room temperature without changing the direction of magnetization of said first layer and which forms an interface magnetic wall between said first and second layers in at least each recording portion;

(f) means which radiates a further light beam to said medium; and (g) modulation means which pulse-modulates intensity of the further light beam, in accordance with binary information to be recorded, between a first intensity level which imparts to a recording portion a temperature at least as high as the Curie temperature of said first layer and lower than the Curie temperature of said second layer and which thereby forms a mark having no interface magnetic wall between said first and second layers, and a second intensity level, including zero-level, which imparts to a recording portion a temperature lower than a lowest temperature at which said interface magnetic wall between said first and second layers disappears, whereby said mark is not formed.

10. An apparatus according to claim 9, further comprising:

external field applying means which generates a magnetic field in a direction opposite to said predetermined direction and which causes disappearance of any interface magnetic wall present between said first and second layers at a region between said mark and a neighboring such mark.

11. A non-overwritable magnetooptical recording apparatus comprising:

(a) a magnetooptical recording medium including at least first and second exchange-coupled layers having perpendicular magnetic anisotrophy, the second layer having a Curie temperature higher than a Curie temperature of the first layer, a direction of magnetization of said second layer being capable of being aligned in a predetermined direction by an external magnetic field at a room temperature without changing a direction of magnetization of said first layer;

(b) means for rotating said medium;

(c) external magnetic field applying means which, in at least each recording portion of said medium, aligns the direction of magnetization of said second layer in a direction opposite to the predetermined direction at the room temperature without changing the direction of magnetization of said first layer;

(d) means which radiates to said medium a non-modulated laser beam at a predetermined intensity level that imparts to each recording portion a temperature at least as high as the Curie temperature of said first layer and lower than the Curie temperature of said second layer and which causes disappearance of an interface magnetic wall which may be present between said first and second layers;

(e) external magnetic field applying means which, in at least each recording portion of said medium, aligns the direction of magnetization of said second layer in the predetermined direction at the room temperature without changing the direction of magnetization of said first layer and which forms an interface magnetic wall between said first and second layers in at least each recording portion;

(f) means which radiates a further light beam to said medium; and (g) modulation means which pulse-modulates intensity of the further light beam, in accordance with binary information to be recorded, between a first intensity level which imparts to a recording portion a temperature lower than the Curie temperature of said first layer and at least as high as a lowest temperature at which an interface magnetic wall between the first and second layers disappears and which thereby forms a mark having no interface magnetic wall between said first and second layers, and a second intensity level, including zero-level, which imparts to a recording portion a temperature lower than said lowest temperature at which said interface magnetic wall disappears, whereby said mark is not formed.

12. An apparatus according to claim 11, further comprising:

external field applying means which generates a magnetic field in a direction opposite to said predetermined direction and which causes disappearance of any interface magnetic wall present between said first and second layers at a region between said mark and a neighboring such mark.

* * * * *